United States Patent
Smith et al.

(10) Patent No.: US 9,832,653 B2
(45) Date of Patent: Nov. 28, 2017

(54) DYNAMIC ALLOCATION OF WIRELESS SPECTRUM FOR UTILIZATION BY WIRELESS OPERATOR NETWORKS

(71) Applicants: Kirk D. Smith, Chandler, AZ (US); Srikathyayani Srikanteswara, Portland, OR (US); Carlos Cordeiro, Portland, OR (US); Bahareh Sadeghi, Portland, OR (US)

(72) Inventors: Kirk D. Smith, Chandler, AZ (US); Srikathyayani Srikanteswara, Portland, OR (US); Carlos Cordeiro, Portland, OR (US); Bahareh Sadeghi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 13/865,254

(22) Filed: Apr. 18, 2013

(65) Prior Publication Data
US 2014/0315560 A1  Oct. 23, 2014

(51) Int. Cl.
*H04W 16/14* (2009.01)
*H04W 16/04* (2009.01)

(52) U.S. Cl.
CPC ............ *H04W 16/14* (2013.01); *H04W 16/04* (2013.01)

(58) Field of Classification Search
CPC .............................. H04W 72/04; H04W 72/12
USPC ......................................................... 455/450
See application file for complete search history.

(56) References Cited

U.S. PATENT DOCUMENTS

| | | | | |
|---|---|---|---|---|
| 2007/0281710 A1* | 12/2007 | Bai | ...................... | H04W 16/10 455/452.1 |
| 2008/0108365 A1* | 5/2008 | Buddhikot | ............ | H04W 16/10 455/452.1 |
| 2012/0082100 A1* | 4/2012 | Ahmadi | ............ | H04W 72/1215 370/329 |
| 2013/0005374 A1* | 1/2013 | Uusitalo | ............... | H04W 28/26 455/509 |

* cited by examiner

*Primary Examiner* — Omoniyi Obayanju
(74) *Attorney, Agent, or Firm* — Eversheds Sutherland (US) LLP

(57) ABSTRACT

Certain embodiments herein are directed to determining an allocation of wireless spectrum, which may include one or more frequencies for communicating content, among operator networks that provide wireless (for example, cellular) services to their customers. Information associated with a supply of wireless spectrum and a demand for wireless spectrum may be analyzed to determine an allocation of the wireless spectrum. Various techniques may be used to determine the allocation, such as various types of auctions, mathematical or statistical techniques, and/or heuristic approaches that may consider various factors. Upon determining an allocation of the wireless spectrum, configuration information associated with the wireless spectrum may be determined and sent to one or more devices associated with respective operator networks, where the configuration information may be used to configure the operator network to utilize the allocated wireless spectrum.

28 Claims, 8 Drawing Sheets

576 MHZ SPECTRUM SUPPLY AVAILABLE FROM 12:00 AM - 12:00 PM

| Price | Geo Location | Amt Spectrum | Start Time | Stop Time |
|---|---|---|---|---|
| $25,000 | Grid 1A | 40 MHz | 12:00 AM | 1:00 AM |
| $27,500 | Grid 1A | 44 MHz | 1:01 AM | 2:00 AM |
| $25,000 | Grid 1A | 48 MHz | 2:01 AM | 3:00 AM |
| $25,000 | Grid 1A | 48 MHz | 3:01 AM | 4:00 AM |
| $21,500 | Grid 1A | 56 MHz | 4:01 AM | 5:00 AM |
| $30,000 | Grid 1A | 40 MHz | 5:01 AM | 6:00 AM |
| $35,000 | Grid 1A | 48 MHz | 6:01 AM | 7:00 AM |
| $37,500 | Grid 1A | 44 MHz | 7:01 AM | 8:00 AM |
| $38,500 | Grid 1A | 54 MHz | 8:01 AM | 9:00 AM |
| $40,000 | Grid 1A | 44 MHz | 9:01 AM | 10:00 AM |
| $45,000 | Grid 1A | 48 MHz | 10:01 AM | 11:00 AM |
| $48,000 | Grid 1A | 54 MHz | 11:01 AM | 12:00 PM |

BID PRICES:
OPERATOR A: $26K
OPERATOR B: $28K
OPERATOR C: $26.4K

BID PRICES:
OPERATOR A: $46.5K
OPERATOR B: $49K
OPERATOR C: $45K

FIG. 4A

SUPPLY INFORMATION 405:
145 MHZ WIRELESS SPECTRUM
AVAILABLE FROM 10:00:01 AM TO 10:00:11 AM

DEMAND SCHEDULE 420

| Price | Geo Location | Amt Spectrum | Start Time | Stop Time |
|---|---|---|---|---|
| $5,000 | Grid 1A | 10 MHz | 10:00:01 | 10:00:02 |
| $5,000 | Grid 1A | 10 MHz | 10:00:02 | 10:00:03 |
| $5,000 | Grid 1A | 10 MHz | 10:00:03 | 10:00:04 |
| $7,500 | Grid 1A | 25 MHz | 10:00:04 | 10:00:05 |
| $6,500 | Grid 1A | 20 MHz | 10:00:05 | 10:00:06 |
| $7,500 | Grid 1A | 30 MHz | 10:00:06 | 10:00:07 |
| $6,500 | Grid 1A | 15 MHz | 10:00:07 | 10:00:08 |
| $7,000 | Grid 1A | 15 MHz | 10:00:08 | 10:00:09 |
| $5,000 | Grid 1A | 10 MHz | 10:00:09 | 10:00:10 |
| $5,000 | Grid 1A | 10 MHz | 10:00:10 | 10:00:11 |

AVERAGE = $6,000    AVERAGE = 15 MHZ

FIG. 4B

DYNAMIC ALLOCATION OF WIRELESS SPECTRUM FOR UTILIZATION BY WIRELESS OPERATOR NETWORKS

TECHNICAL FIELD

Embodiments of this disclosure relate generally to wireless networks, and more particularly, to implementing a real-time auction of wireless spectrum.

BACKGROUND

Operators of wireless communication systems may compete against one another to gain access to a limited supply of wireless spectrum. The wireless spectrum may enable users of wireless devices to communicate data, text, voice, video, multimedia, or other information over the wireless spectrum. Existing processes for securing such wireless spectrum may have large lead times and may be too infrequent to meet evolving demands that users place on an operator's network. For example, operators may receive an opportunity to purchase contracts for wireless spectrum only a few times per year, when wireless spectrum becomes available, or generally as a result of relatively slow, manual processes.

As demand for communication over an operator's network fluctuates, operators may be unable to respond promptly to such fluctuations since they may be restricted to a purchased, contractual amount of wireless spectrum. Such circumstances may lead to an inability to meet user demand for information, poor utilization of an operator's wireless network, and/or other unfortunate consequences.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

FIG. 4A illustrates example supply information for use in an auction to determine an allocation of wireless spectrum, according to an embodiment of the disclosure.

FIG. 4B illustrates example supply information and demand information for use in an auction to determine an allocation of wireless spectrum, according to an embodiment of the disclosure.

Figure 1:
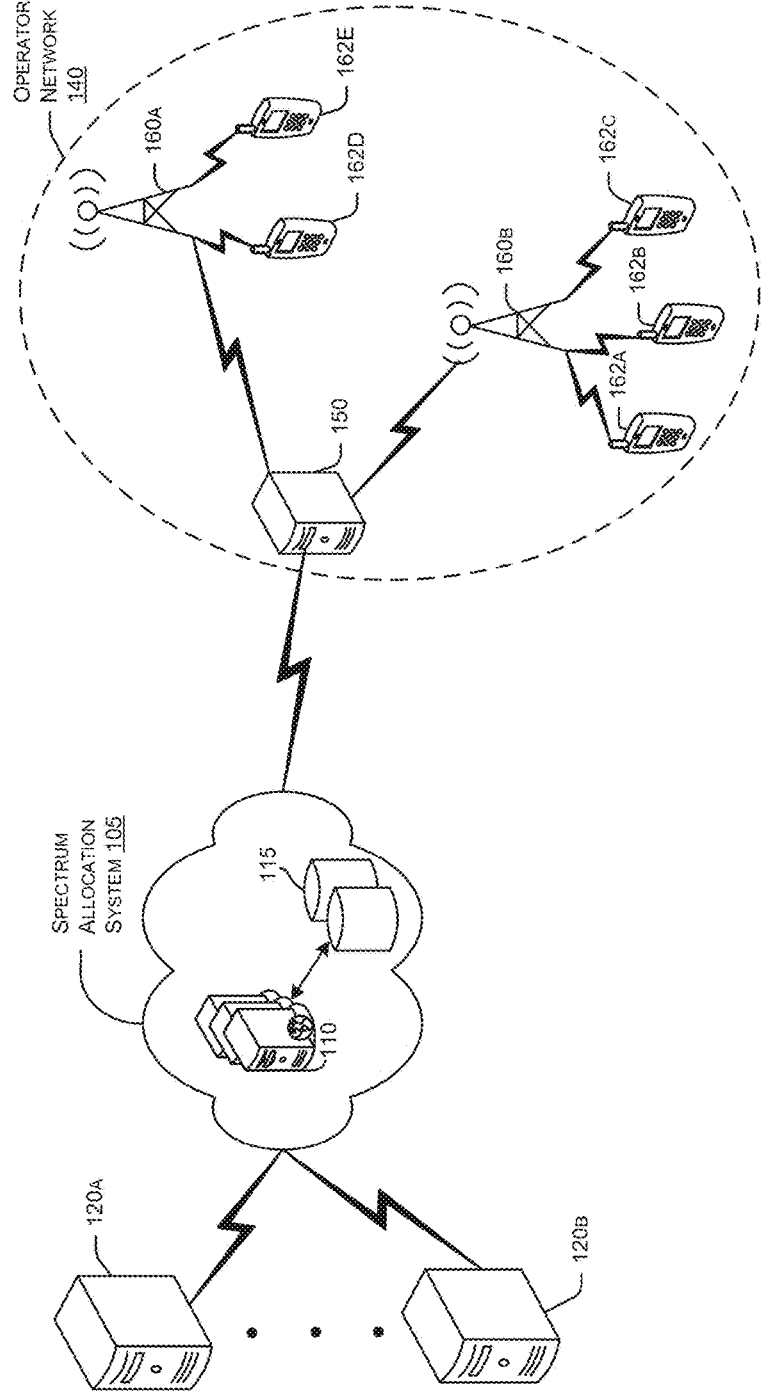
FIG. 1 illustrates an example wireless communication system that may be used to implement dynamic allocation of wireless spectrum, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein are directed to, among other things, the dynamic allocation of wireless spectrum for utilization by operator networks. An operator network may enable users of mobile devices, such as cellular phones or other devices configured for wireless communication, to send and receive content over a wireless network. A certain amount of wireless spectrum may be dedicated for such communication by a government or other entity that controls or provides frequencies associated with the wireless spectrum for communicating the content. Certain embodiments herein relate to allocating the wireless spectrum for use by operator networks for servicing their customers. Put another way, a limited amount of wireless spectrum may be divided or split among operator networks using certain techniques described herein.

In one embodiment, the allocation of wireless spectrum may be determined based on information from suppliers of wireless spectrum and requesters of wireless spectrum (for example, operator networks). Information from suppliers of the wireless spectrum (supply information) may include information associated with the wireless spectrum, such as a purchase price for the wireless spectrum and a future supply of available wireless spectrum, among other information described herein. Information from requesters of wireless spectrum (demand information) may include a desired amount of wireless spectrum, a time period during which the wireless spectrum is desired, and an offer price for purchasing the wireless spectrum, among other information. Systems and methods herein may relate to analyzing such information to determine which one or more operator networks may receive an allocation of wireless spectrum and the amount of such allocation.

In certain embodiments, various types of auctions may be implemented to determine an allocation of wireless spectrum. In at least a portion of these auctions, bid prices identified in demand information may be compared to one another to determine a winning bidder (for example, an operator network) of the wireless spectrum. For example, the highest bidder may be determined to be the winning bidder, in one embodiment. In other embodiments, other techniques may be used to determine the allocation. Such techniques may consider various factors, such as time (for example, utilization time of wireless spectrum), operator network operational parameters, historical data, and various mathematical techniques, as non-limiting examples. Examples of each of these techniques are described in greater detail below.

Upon determining an allocation of wireless spectrum, configuration information associated with the wireless spectrum, such as corresponding frequencies, authentication information, etc., may be determined and sent to a device associated with an operator network that won an auction or otherwise was determined to receive at least a portion of the wireless spectrum. The device may use the information to configure the operator network such that it may utilize the allocation of wireless spectrum. Certain embodiments herein may ensure that the configuration occurs at the next interval of propagation, or the point at which wireless signals carrying user content may be transmitted, in one embodiment. Load balancing and/or system utilization techniques, for example, may facilitate such transmission in certain embodiments.

In certain embodiments, systems and methods herein may also facilitate the determination of supply information associated with available wireless spectrum. In one embodiment, historical demand information may be analyzed to predict a future supply of desired wireless spectrum. The results of the analysis may be shared with providers of wireless spectrum, which may use the information to more efficiently determine and price available supplies of wireless spectrum.

FIG. 1 depicts an example wireless communication system 100 that may be used to implement dynamic allocation of wireless spectrum, according to an embodiment of the disclosure. As shown in FIG. 1, a spectrum allocation system 105 may include one or more spectrum allocation devices 110, data stores 115, and other devices or components for implementing or facilitating the processes described herein. According to one configuration, the spectrum allocation device 110 may communicate with devices in the operator network 140, such as the operator device 150, and with spectrum provider devices 120a and 120b, among other devices. In one example, the spectrum allocation device 110 may receive information associated with available wireless spectrum ("supply information") from the spectrum provider devices 120a and/or 120b, and may also receive information associated with a demand for available wireless spectrum ("demand information") from the operator device 150 associated with the operator network 140. The spectrum allocation device 110 may determine an allocation of wireless spectrum based on such information, as will be described in greater detail below.

Although a certain number of each system, device, or network is shown in FIG. 1, a different number of each may exist in other examples. For example, numerous operator networks 140 that provide wireless services for users of the mobile devices 162a-e may participate in a determination for allocating wireless spectrum. Also, numerous primary spectrum provider devices 120a may provide wireless spectrum. Each of the systems or devices will now be described in turn.

Some configurations of the spectrum allocation system 105 may include a cloud computing arrangement in which shared computing resources, such as those described above, may perform one or more services associated with implementing the processes described herein. Other configurations may exist in other embodiments, including those in which functions described herein may be distributed among multiple systems or devices, or may be performed by a dedicated device.

As described, the spectrum provider devices 120a and 120b may send information associated with a supply of available wireless spectrum to the spectrum allocation system 105. The spectrum provider devices 120a and 120b may be associated with a government or other entity that may control access to electromagnetic waves in various geographical regions. Such entities may allocate a portion of the electromagnetic waves for certain types of communication, such as that for wireless, video, radio, etc. The allocation may include a certain frequency or range of frequencies. For example, a certain range of frequencies may be dedicated for wireless communication for use by users of mobile devices to send and receive content over electromagnetic waves associated with at least a portion of the frequencies.

An amount of wireless spectrum as used herein may refer to a certain number of frequencies that may be available within a frequency band or block of frequencies. For example, the 800 MHz frequency band may include frequencies 790 MHz-862 MHz. An amount of available spectrum (e.g., 25 MHz) may include frequencies 810 MHz-834 MHz, or another portion or range of frequencies equivalent to 25 MHz in the 800 MHz frequency band. Numerous other amounts of wireless spectrum, corresponding numbers of frequencies, frequency bands, etc., may exist in other examples.

The spectrum allocation system 105 may utilize supply information received from the spectrum provider devices 120a and 120b to determine to which operator networks 140 to allocate the available wireless spectrum. Such information may be referred to herein as supply information in the way that it relates to information associated with an available supply of wireless spectrum. Example information may include, but is not limited to, an amount of available wireless spectrum, one or more frequencies associated with the available wireless spectrum, a geographical location of the wireless spectrum, an identification of a base station associated with the available wireless spectrum, a location associated with the base station, a price for purchasing the wireless spectrum, a start time at which utilization of the wireless spectrum begins, a stop time at which utilization of the wireless spectrum ends, an authorization code that may be required for accessing the wireless spectrum, terms of utilizing the wireless spectrum, and other information that may be used by an operator network 140 to configure the operator network 140 for utilization of the wireless spectrum.

The operator network 140 may include various systems, devices, or components that may configure the operator network 140 to enable wireless communication via the wireless spectrum. An operator network 140 may be owned, controlled, or managed by various service providers, such as wireless service providers, telecommunications service providers, or other providers that may be licensed to utilize one or more frequencies associated with the wireless spectrum. In certain embodiments herein, the service providers may provide cellular communication services to users of mobile devices, mobile telephones, or other devices that may include a radio. The service providers may compete for a limited amount of wireless spectrum to facilitate such services, as will be explained below.

According to one configuration, example devices in the operator network 140 may include, but are not limited to, an operator device 150 (or a mobile switching center), base stations 160a and 160b, and mobile devices 162a-e. Fewer or more of the devices shown in the operator network 140 may exist in other embodiments. The operator device 150 may serve as a controller for the operator network 140, in one embodiment. For example, the operator device 150 may coordinate the actions of the base stations 160a and 160b, for example, as mobile devices 162a-e move between cells covered by the base stations 160a and 160b. In another example, the operator device 150 may also serve as a switch for routing cellular communications into, or receiving communications from, the Public Switched Telecommunications Network (PSTN) or other networks. In a further example, the operator device 150 may also communicate with one or more visitor location registers (VLRs) and/or home location registers (HLRs) to access information associated with the mobile devices 162a-e, such as, but not limited to, a unique international mobile subscriber identity (IMSI), the services allowed for each IMSI, locations (e.g., last known location) of the mobile devices 162a-e, and authentication data used to determine access to the operator network 140 for each mobile device 162a-e. In yet another example, the operator device 150 may perform billing operations, such as generating bills for users of the mobile devices 162a-e based on usage or other contractual terms which may be stored in registers, databases, other data stores, etc., accessible by the operator device 150.

Various communication links, including fiber optic links, cable links, microwave links configured to utilize wireless spectrum as described herein, etc., may connect the operator device 150 to PSTN devices (not shown), to the base stations 160a and 160b, and to the spectrum allocation device 110 in the spectrum allocation system 105, in one embodiment.

According to one example, the operator device 150 may determine user demand on the operator network 140, determine an amount of desired wireless spectrum in response to the demand, and send a bid to the desired wireless spectrum allocation system 105, for example, via one or more microwave links. The determined user demand may be received by the spectrum allocation system 105 in real-time, substantially real-time, or near real-time such that the operator device 150 may receive an amount of wireless spectrum commensurate with a current level of user activity in the operator network 140, in one embodiment. In another example, the operator device 150 may communicate with the base stations 160a and/or 160b to modify the operator network's 140 utilization of wireless spectrum, as will be described in greater detail below.

The base stations 160a and/or 160b may be a wireless communication station installed at a fixed location to facilitate communication over various types of networks, such as cellular Code Division Multiple Access (CDMA), Global System for Mobile Communications (GSM), wireless local loop, wide area network (WAN), wireless fidelity (WiFi), Worldwide Interoperability for Microwave Access (WiMax), etc. The base stations 160a and/or 160b may include a base transceiver station, a base station controller, and other components to facilitate such communication, in one configuration.

The base station controller may interface with the operator device 150 and may determine to which base stations 160a or 160b to route content, such as a voice call. The base station controller may route information to a particular base station 160a (for example, based on a geographic location of the base station 160a or 160b) in response to the operator network 140 winning a bid for available wireless spectrum. As described herein, such information may reconfigure the base stations 160a and/or 160b to communicate over the wireless spectrum that includes a different range of frequencies than utilized at the previous interval of propagation.

The base station controller may also interface with base transceiver stations (or radio base stations), which may communicate directly with the mobile devices 162a-e. A base transceiver station may include various components, such as an electronics section and one or more antennas. The electronics section may include electronics for implementing communication with the mobile devices 162a-e. Such electronics may include radio frequency (RF) amplifiers, radio transceivers, RF combiners, and power supplies with redundant power sources, among other electronics. The one or more antennas may convert electric power into radio waves, and vice versa, for use by the base transceiver station. In some configurations, the base transceiver stations may be coupled to two sets of receive antennas to provide diversity reception, for example, to reduce the effects of multipath propagation.

The mobile devices 162a-e may include hardware and/or software modules that may enable the mobile devices 162a-e to communicate with a respective base station for sending information to the operator device 150. In one embodiment, the mobile devices 162a-e may include software drivers that enable such communication. The software drivers may configure the mobile devices 162a-e to use certain allocations of wireless spectrum or frequencies. Such allocations may be based on various types of auctions or on other types of determinations, some of which will be described in greater detail below.

Figure 2:
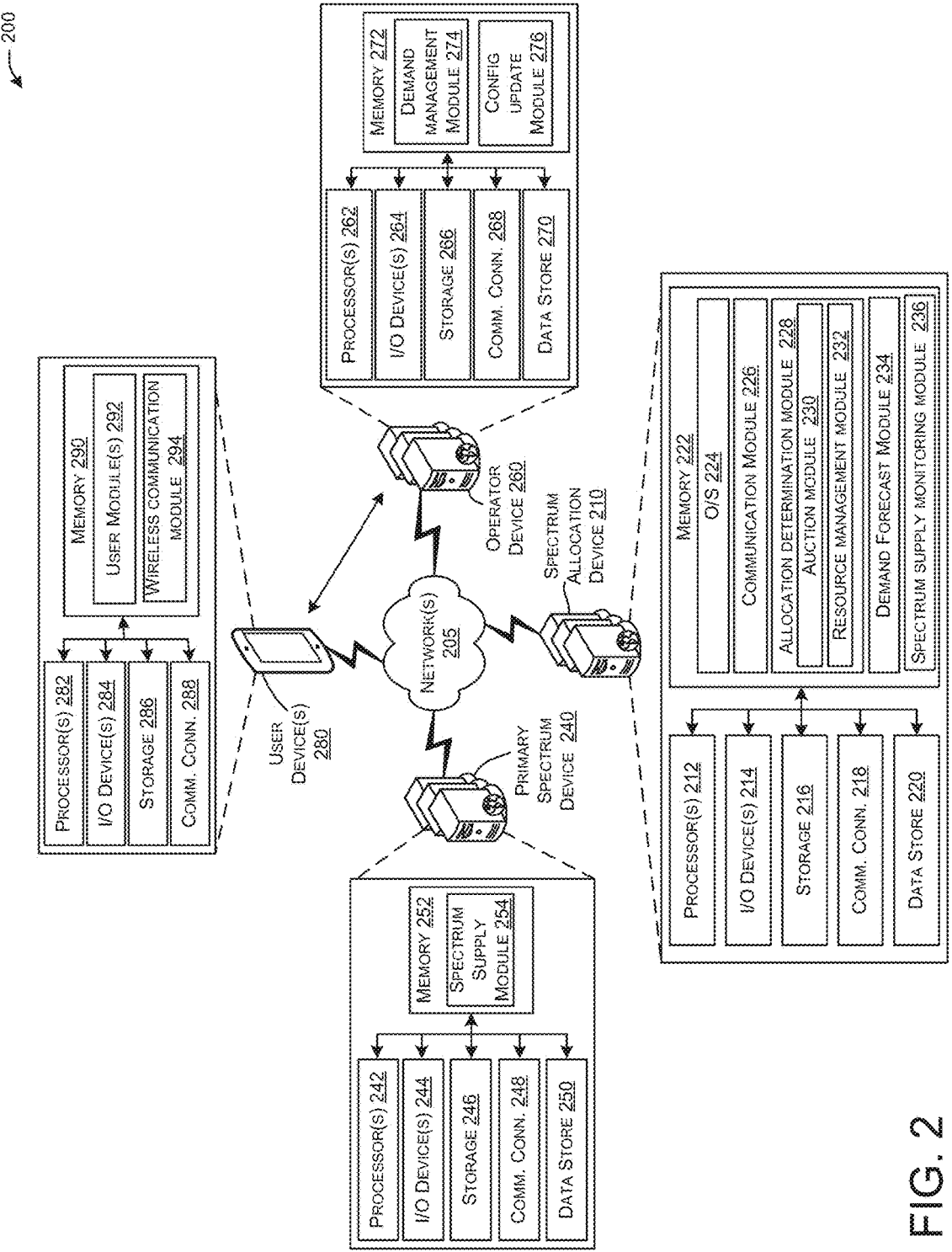
FIG. 2 illustrates a block diagram of an example computing system for implementing dynamic allocation and utilization of wireless spectrum, according to an embodiment of the disclosure.

FIG. 2 depicts a block diagram of an example computing system 200 for implementing dynamic allocation of wireless spectrum, according to an embodiment of the disclosure. The computing system 200 may include, but is not limited to, a spectrum allocation device 210, a primary spectrum device 240, an operator device 260, and a user device 280. Although only one of each device is shown, more may exist in other embodiments. As described above, the devices in FIG. 2 may communicate with one another over the one or more networks 205 to facilitate the processes described herein. For example, the spectrum allocation device 210 may receive supply information from the primary spectrum device 240 and demand information from the operator device 260, may perform an auction to determine a winning bidder of the available wireless spectrum identified in the supply information, and may send information associated with the auction to the winning bidder and to the primary spectrum device 240. The operator device 260 may communicate with various systems and/or devices, such as the base stations 160a and 160b in FIG. 1, to send content to, or receive content from, the mobile devices 162a-e. Various other communications between the devices in FIG. 2 may exist in other examples.

As used herein, the term "device" may refer to any computing component that includes one or more processors that can be configured to execute computer-readable, computer-implemented, or computer-executable instructions. Example devices may include personal computers, server computers, server farms, digital assistants, smart phones, personal digital assistants, digital tablets, Internet appliances, application-specific circuits, microcontrollers, minicomputers, transceivers, or customer premise equipment such as set-top boxes, kiosks, or other processor-based devices. The execution of suitable computer-implemented instructions by one or more processors associated with various devices may form special purpose computers or other particular machines that may implement or facilitate the processes described herein.

At least a portion of the devices shown in FIG. 1 may include a radio receiver (not shown). A physical layer interface in the radio receiver may include a radio frequency (RF) unit that may be configured to provide for reception of one or more RF signals. According to one configuration, the RF unit may include an amplifier, a mixer, a local oscillator, and so forth. The RF unit may be implemented as discrete electronic components, integrated circuits, software-defined radio, or a combination thereof, according to various configurations. At least a portion of the devices in FIG. 1 may also include a radio transmitter that may enable the devices to send one or more RF signals to one another. In some configurations, the devices may include a radio transceiver that may receive and send RF signals. The transceiver (or the receiver and/or the transmitter) may be coupled to one or more antennas, such as those associated with the operator network 140.

The one or more networks 205 may facilitate communication between the devices shown in FIG. 2, as well as other devices. The one or more networks 205 may include any number of wired or wireless networks that may enable various computing devices in the example computing system 200 to communicate with one another. In certain embodiments herein, the wireless networks may include, but are not limited to, CDMA, GSM, wireless local loop, WAN, WiFi, and WiMax. In some embodiments, other networks, intranets, or combinations of different types of networks may be used including, but not limited to, the Internet, intranets, cable networks, cellular networks, landline-based networks, radio networks, satellite networks, WiFi Direct networks, Bluetooth® networks, or other communication mediums connecting multiple computing devices to one another. Other embodiments may not involve a network and may, for example, provide features on a single device or on devices that are directly connected to one another.

The devices in FIG. 2 may include one or more processors configured to communicate with one or more memory devices and various other components or devices. For example, the spectrum allocation device 210 may include one or more processors 212, one or more input/output (I/O) devices 214, storage 216, one or more communication connections 218, and one or more data stores 220. The processor 212 may be implemented as appropriate in hardware, software, firmware, or a combination thereof. The processors 242, 262, and 282 associated with the primary spectrum device 240, the operator device 260, and the user device 280 may be the same or at least similar to the processor 212, in one embodiment.

The memory 222 may store program instructions that are loadable and executable on the processor 212, as well as data generated during the execution of these programs. Depending on the configuration and type of spectrum allocation device 210, the memory 222 may include one or more types of volatile and/or non-volatile memory. Example memory may include, but is not limited to, random access memory (RAM), static random access memory (SRAM), dynamic random access memory (DRAM), read-only memory (ROM), and flash memory. The memory 252, 272, and 290 associated with the primary spectrum device 240, the operator device 260, and the user device 280 may be the same or at least similar to the memory 222, in one embodiment.

The storage 216 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 246, 266, and 286 associated with the primary spectrum device 240, the operator device 260, and the user device 280 may be the same or at least similar to the storage 216, in one embodiment.

The memory 222 and the storage 216, both removable and non-removable, are all examples of computer-readable storage media. For example, computer-readable storage media may include volatile and non-volatile, removable and non-removable media implemented in any method or technology for storing information such as computer-readable instructions, data structures, program modules, or other data.

The one or more communication connections 218 may allow the spectrum allocation device 210 to communicate with other devices, such as the primary spectrum device 240, the operator device 260, databases, and various other devices that may exist on the one or more networks 205. The one or more communication connections 248, 268, and 288 associated with the primary spectrum device 240, the operator device 260, and the user device 280 may be the same or at least similar to the one or more communication connections 218, in one embodiment.

The I/O devices 214 may enable a user to interact with the spectrum allocation device 210 to perform various functions, including installing and configuring databases, software, and/or program modules, etc., for implementing or facilitating the processes described herein. The I/O devices 214 may include a keyboard, a mouse, a pen, a voice input device, a touch input device, a display, a camera or an imaging device, speakers, a printer, etc. The I/O devices 244, 264, and 284 associated with the primary spectrum device 240, the operator device 260, and the user device 280 may be the same or at least similar to the I/O devices 214, in one embodiment.

The one or more data stores 220 may store lists, arrays, databases, flat files, etc. In some implementations, the data stores 220 may be stored in memory external to the spectrum allocation device 210 but may be accessible via the one or more networks 205, such as with a cloud storage service. The data stores 220 may store information that may facilitate the processes described herein. Such information may include, but is not limited to, supply and demand information (as described above); auction-related information, such as historical bid prices, winning bid prices, winning bidding entities, etc.; and rules, factors, or criteria for determining a winning entity of available wireless spectrum. The one or more data stores 250 and 270 associated with the primary spectrum device 240 and the operator device 260 may be the same or at least similar to the one or more data stores 220, in one embodiment.

The memory 222 may also store an operating system (O/S) 224 and various software applications and/or modules that may implement or facilitate the processes described herein. Example modules may include, but are not limited to, a communication module 226, an allocation determination module 228, and a demand forecast module 234. Each of these modules may be implemented as individual modules that provide specific functionality associated with the dynamic allocation of wireless spectrum. Alternatively, one or more of the modules may perform all or at least some of the functionality associated with the other modules.

The communication module 226 may configure the spectrum allocation device 210 to communicate with the devices shown in FIG. 2. The communication module 226 may utilize various protocols to enable such communication including, but not limited to, Transmission Control Protocol/Internet Protocol (TCP/IP), socket-based protocols such as the WebSocket protocol, Simple Mail Transfer Protocol (SMTP) for transmitting messages via electronic mail, Short Message Service (SMS) text messaging for supporting communication with a mobile device, Hypertext Transfer Protocol (HTTP), or other message formats and/or rules for exchanging information between the spectrum allocation device 210 and the devices in FIG. 2.

An example communication enabled by the communication module 226 may include receiving messages that include supply and demand information from the primary spectrum device 240 and the operator device 260, respectively. In some embodiments, the communication module 226 may further parse the messages to extract information for use in the determinations described herein. The messages may be formatted in a manner that allows such extraction. Example formats may include CSV format, text-delimited formats, extensible markup language format, or other formats in which information is organized in a fashion that allows the communication module 226 to extract and identify the information in the messages. The communication module 226 may also construct messages for distribution to other devices in FIG. 2 using one or more of these formats such that a device receiving the messages may also extract information from the messages, in certain embodiments. Various other types of communications, formats, etc., may exist in other embodiments.

The allocation determination module 228 may determine an allocation of wireless spectrum among one or more operator devices 260. As used herein, determining an allocation of wireless spectrum may refer to the process of determining an amount of wireless spectrum that may be used by an operator network for providing wireless (e.g., cellular) communication services to its customers or users of mobile devices. Such a determination may be based on various criteria and/or techniques that may consider various factors in making the allocation determination. Example techniques may include various types of auctions. Auctions and other techniques that will be described herein may be based on various factors, such as time (for example, utilization time of wireless spectrum), operator network operational parameters, historical data, and various mathematical techniques, as non-limiting examples.

The allocation determination module 228 may include an auction module 230 and a resource management module 232 to implement or facilitate an auction to determine a winning bidder of wireless spectrum (for example, an operator device 260 associated with an operator network), in certain embodiments. The auction module 230 may perform various functions to make such a determination. One such function may include identifying an available supply of wireless spectrum. In one embodiment, such information may be received from the primary spectrum device 240. In one aspect of the embodiment, the information may include a current and/or a future supply of available wireless spectrum. The auction module 230 may make such supplies available to winning bidders, as will be described in greater detail below.

Another function that may be performed by the auction module 230 includes identifying demands or requests for available wireless spectrum. The demands or requests may be received from one or more operator devices 260 associated with operator networks that provide wireless communication services to users of the user devices 280, in one embodiment. The demands or requests may include various information, such as a bid price and a requested amount of wireless spectrum, for example, that may be used to enable communication over the operator networks. In some embodiments, at least one demand for wireless spectrum may include multiple bid prices. In one example, the multiple bid prices may facilitate successive bid offerings in association with certain types of auctions, at least some of which are described below.

The auction module 230 may further match information associated with an available supply of wireless spectrum with demand information. Such matching may include identifying particular demand information received from one or more operator devices 260 that corresponds to available supply information received from one or more primary spectrum devices 240. For example, an available supply of 300 MHz of wireless spectrum may be identified by the auction module 230 from 8:00 AM until 12:00 PM on a certain day. A demand for 500 MHz of wireless spectrum from 8:00 AM until 4:00 PM may also be identified. The auction module 230 may determine that 200 MHz of the available 300 MHz, however, is demanded between the time period of 8:00 AM and 12:00 PM, and submit a bid price associated with a demand of 300 MHz for the relevant time period of 8:00 AM to 12:00 PM. This example is merely for the purpose of illustrating that the auction module 230 may match available supply with demand to ensure that bidders of wireless spectrum may bid on relevant wireless spectrum (for example, wireless spectrum that includes at least the requested amount during a desired time of day). Numerous other examples may exist in other embodiments, some of which will be described in greater detail below.

To determine a winning bidder, the auction module 230 may further compare bid prices submitted by the multiple operator devices 260. Various types of auctions may be implemented to perform the comparison including, but not limited to, forward auctions, such as an English auction, a Dutch auction, a Japanese auction, a Yankee auction, etc.; reverse auctions; a combination of a forward and a reverse auction (for example, a Forward-Reverse auction); second-price sealed-bid auctions (for example, Vickrey auctions), etc. According to one example, the operator device 260 that submits the highest bid price may be determined to be the winning bidder. In another example, the lowest bidder, the second-place bidder, etc., may be determined to be the winning bidder. Numerous other comparisons to determine the winning bidder may exist in other examples. Further, some types of determinations may not involve an auction but may be based on other considerations, as will be described in greater detail below.

The auction module 230 may further construct a message for the winning bidder of an auction or other determination of a winning bidder. Such a message may include information that may configure an operator network (for example, the operator network 140 in FIG. 1) associated with the winning bidder to use the wireless spectrum that was won in an auction. As described, the information may include an amount of wireless spectrum, one or more frequencies associated with the amount of wireless spectrum, an authentication or access code, and/or other parameters that may be utilized by the operator device 260 to configure an associated operator network 140 according to the parameters. The communication module 226 may send the constructed message to the operator device 260, in one embodiment. In some examples, a database accessible by the operator device 260 may be updated with the configuration information such that the operator device 260 may retrieve the information from the database or another data store. Other types of communications, number of messages, etc., may be used in other examples to provide winning bidders (for example, operator devices 260) with configuration information that may be used to update associated operator networks such that they may utilize wireless spectrum as a result of an auction or other determination.

The resource management module 232 may perform functions related to optimizing the performance of the allocation determination module 228. For example, the resource management module 232 may determine an optimal grouping of operator devices 260 to spectrum allocation devices 210. The optimal grouping may ensure that allocation determinations are implemented in a manner that enables operator devices 260 to update respective operator networks for communication using a spectrum allocation during the next interval of propagation. For example, for auctions that are implemented once every second, the resource management module 232 may facilitate the ability of the operator device 260 to update its corresponding operator network in the next second after the auction was conducted (for example, by the auction module 230). In one embodiment, by grouping a certain number of operator devices 260 to the spectrum allocation device 210, the resource management module 232 may enable the spectrum allocation device 210 to conduct the auction in a relatively brief amount of time to facilitate communication during the next interval of propagation.

In one embodiment, the resource management module 232 may determine a grouping of operator devices 260 to each spectrum allocation device 210 based on the results of load balancing, system utilization tests, or previously conducted auctions. For example, if the spectrum allocation device 210 failed to submit configuration information in time for an operator device 260 associated with a winning bidder to reconfigure its respective operator network at the next interval of propagation, then the resource management module 232 may determine that the current number of operator devices 260 grouped or assigned to the spectrum allocation device 210 is too great and may reduce the number grouped for subsequent auctions. Such reductions may occur iteratively (for example, after each auction is run) until the spectrum allocation device 210 determines that the results from the auction (for example, the configuration information) was communicated to the operator device 260 with sufficient time for the operator device 260 to reconfigure its network for communication during the next interval of propagation, in one embodiment. Whether the time is sufficient may be based on a predetermined value of time at which the spectrum allocation device 210 should send the configuration information, in one embodiment. Numerous other techniques may exist.

As mentioned, the memory 222 of the spectrum allocation device 210 may also include a demand forecast module 234. The demand forecast module 234 may determine a demand for available wireless spectrum. In one embodiment, the demand may be based on historical demand information such as that received in association with an auction or other determination of an allocation of wireless spectrum. For example, demand information, such as a requested amount of wireless spectrum, bid prices, etc., received from operator devices 260 over time may be identified. The requested amount of wireless spectrum and respective bid prices may be averaged, weighted averaged, etc., to determine a forecast of demanded wireless spectrum and a corresponding price associated with historical purchases of the demanded wireless spectrum. In one embodiment, a historical demand for each second, minute, hour, day, etc., or a time at which allocation determinations of wireless spectrum were conducted may be determined.

The demand forecast module 234 (or the communication module 226) may send the demand forecast information to the primary spectrum device 240, in one embodiment. The primary spectrum device 240 may use the demand forecast information to determine a supply amount of wireless spectrum for bidding or allocation, a price associated with the supply amount, a particular time at which to offer the supply amount, and any discounts or incentives in price that may generate increased demand, among other information. Such information may be received by the spectrum allocation device 210 (for example, the communication module 226) from the primary spectrum device 240, in one embodiment.

The above techniques for determining a demand forecast and subsequent information based on the demand forecast are only examples. Different techniques or determinations may exist in other examples. In yet other examples, the supply information received from the primary spectrum device 240 may not be based on the demand forecast information described above.

The above descriptions associated with the spectrum allocation device 210 are not meant to be limiting. Numerous other configurations may exist in other embodiments. For example, the functions described above may be performed by one or any number of modules associated with the spectrum allocation device 210 or another device in FIG. 2.

As described, the primary spectrum device 240 may be configured to provide information associated with a supply of available wireless spectrum (supply information) to the spectrum allocation device 210, among other functions. In one embodiment, the memory 252 may include a spectrum supply module 254 to perform the functions. For example, the spectrum supply module 254 may determine the supply information, such as the amount of available wireless spectrum, a price associated with the available wireless spectrum, one or more frequencies associated with the available wireless spectrum, a start time at which utilization of the available wireless spectrum begins, an end time at which utilization of the available wireless spectrum ends, and/or other supply information as identified above.

In one example, the spectrum supply module 254 may determine the available wireless spectrum by monitoring the start and stop times associated with utilization of the wireless spectrum, and upon the stop time being reached, may determine that the associated wireless spectrum is now available. The spectrum supply module 254 may further determine frequencies associated with the available wireless spectrum, for example, by accessing such information in a database or other data store. A price required for purchasing the available wireless spectrum and the start and stop times associated with utilizing the available wireless spectrum may be determined based on various considerations, such as the demand forecast information received by the primary spectrum device 240 from the spectrum allocation device 210, in one embodiment. For example, the spectrum supply module 254 may determine a price based on historical demand. In one embodiment, the price may be determined based at least in part on the average bid prices associated with historical winning bids for the available wireless spectrum. The weighted average or other mathematical techniques may be used to determine the price in other embodiments. Numerous other determinations may be made in other examples, some of which will be described in greater detail below.

The spectrum supply module 254 may also configure the primary spectrum device 240 to send supply information and other information to the spectrum allocation device 210 and/or other devices, as well as receive various information, such as that described above, from such devices. The spectrum supply module 254 may perform various other functions in other embodiments.

In certain embodiments, at least a portion of the functionality provided by the spectrum supply module 254 may be provided by the spectrum allocation device 210. For example, the spectrum allocation device 210 may monitor the start and stop times associated with utilizing wireless spectrum and may notify the primary spectrum device 240 that certain wireless spectrum has become available, as well as identifying at least a portion of the relevant information as described above. According to these embodiments and examples, the spectrum allocation device 210 may include a spectrum supply monitoring module 236, as shown in FIG. 2, to perform such functions.

The above descriptions and examples associated with the primary spectrum device 240 are for purposes of illustration and are not meant to be limiting. Numerous other examples may exist in other embodiments. For example, in some embodiments, particular frequencies associated with an amount of available wireless spectrum may be considered in an auction implemented by the spectrum allocation device 210. Demand information received by the spectrum allocation device 210 may further include frequencies such that the spectrum allocation device 210 (e.g., via the allocation determination module 228) may match the available frequencies with the demanded frequencies and determine an allocation of the frequencies based at least in part on such information.

The memory 272 of the operator device 260 may include one or more modules for implementing processes associated with providing wireless communication services to users of the user devices 280, among other functions. In one embodiment, such functions may be performed by the demand management module 274 and the configuration update module 276.

The demand management module 274 may monitor an operator network (for example, the operator network 140 in FIG. 1) to determine a demand for wireless communication. Based on the determined demand, the demand management module 274 may submit a request for a certain amount of wireless spectrum, and a price (e.g., a bid price) for purchasing the requested wireless spectrum, as well as other information that may facilitate receiving wireless spectrum for providing services to the user devices 280. Such a request may be referred to herein as demand information, in certain embodiments. Examples associated with determining such demand information, sending the demand information to the spectrum allocation device 210 for a determination of an allocation of wireless spectrum, and other functions, are provided below.

The configuration update module 276 may configure or update one or more operator networks (for example, the operator network 140) associated with the operator device 260. In certain embodiments herein, the configuration update module 276 may receive configuration information as a result of an auction or other determination of an allocation of wireless spectrum and reconfigure the operator network 140 based on at least a portion of the configuration information. Example configuration information may include an amount of wireless spectrum to be allocated for utilization by the operator network 140 (via the operator device 260), one or more frequencies associated with the amount of wireless spectrum, a time range for which the wireless spectrum may be utilized, an authentication code that may be required to access the wireless spectrum, etc.

In one example, the configuration update module 276 may reconfigure the operator network 140 to use an additional amount of wireless spectrum, for example, as a result of determining (for example, by the demand management module 274) that demand for wireless communications has increased. As described above, the reconfiguration may occur at the next interval of propagation such that the operator network 140 may leverage the additional wireless spectrum (or a decreased amount of wireless spectrum) in real-time, substantially real-time, or near real-time. Numerous other examples may exist, some of which will be described below.

The user devices 280 may be utilized by users to send and receive content over the one or more wireless networks 205. The memory 290 of the user device 280 may include various software and/or modules (for example, user modules 292) that may enable communication of the content, interaction with the content, and/or other functions. The memory 290 may also include a wireless communication module 294, which may include one or more device drivers that configure the user device 280 to communicate over the network 205. In certain embodiments, the wireless communication module 294 may receive an indication from the operator device 260 (for example, the configuration update module 276) that an allocation of wireless spectrum has changed. In response, the wireless communication module 294 may reconfigure the user device 280 to utilize the new allocation of wireless spectrum. The wireless communication module 294 may also send a message associated with the reconfiguration to the operator device 260. The message may include an indication that the user device 280 was successfully or unsuccessfully reconfigured, among other information.

The above descriptions and examples are for purposes of illustration and are not meant to be limiting. Additional descriptions and examples may exist in other embodiments. For example, at least a portion of the functionality described in association with certain devices may be performed by one or more other devices. In this way, the described functionality may be distributed among one or any number or combination of devices. As another example, different modules for implementing other types of functionality, types of communication, etc., in support of dynamically allocating wireless spectrum and utilizing the wireless spectrum in an operator network may also exist.

Figure 3:
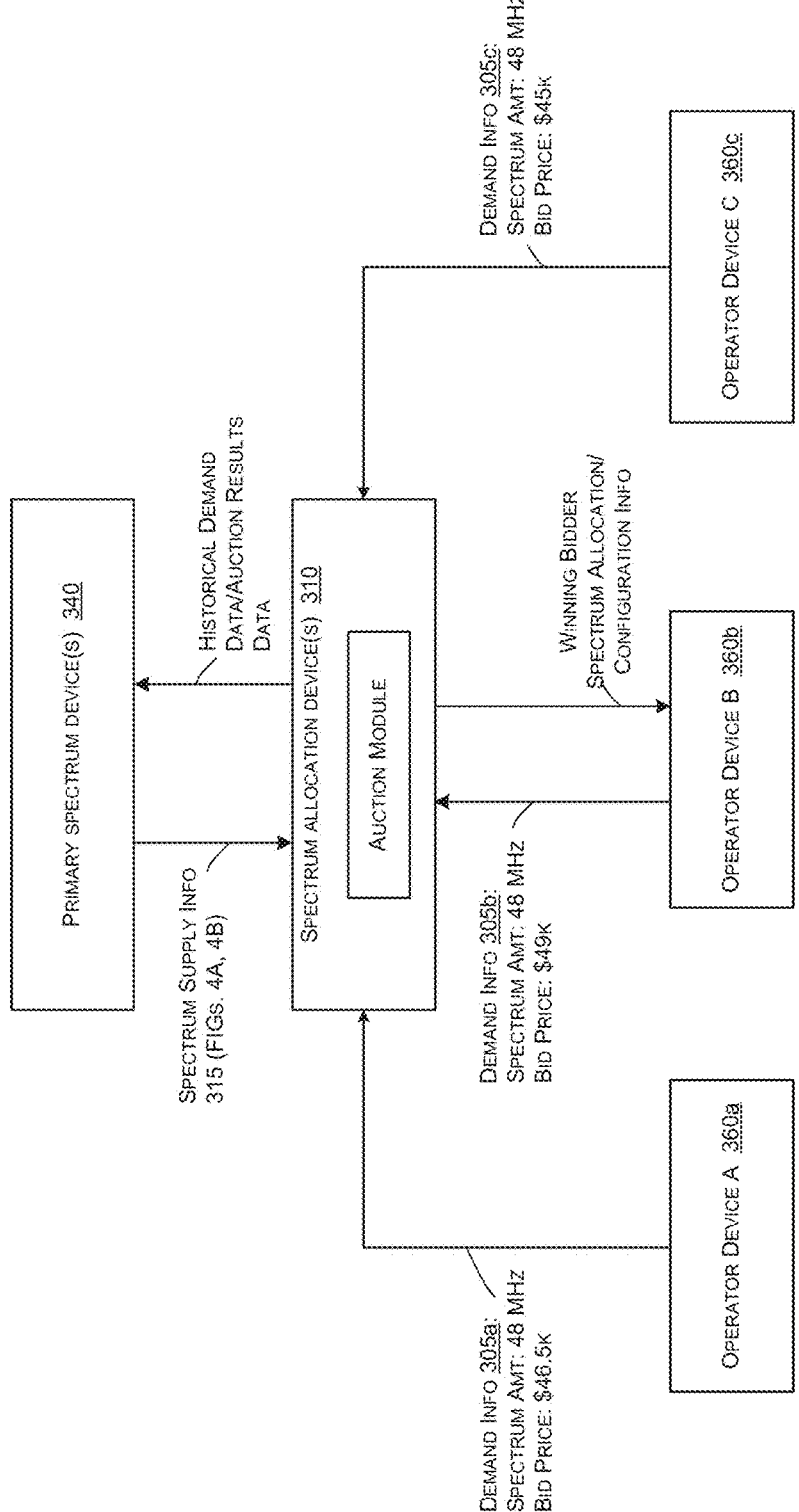
FIG. 3 illustrates a block diagram of an example process for determining an allocation of wireless spectrum, according to an embodiment of the disclosure.

FIG. 3 depicts a block diagram of an example process for determining an allocation of wireless spectrum, according to an embodiment of the disclosure. In one embodiment, an auction may be implemented (for example, by the auction module associated with the spectrum allocation device 310) to make such a determination. As shown in FIG. 3, the spectrum allocation device 310 may receive demand information 305a, 305b, and 305c from operator devices 360a, 360b, and 360c, respectively. The demand information may include, but is not limited to, an amount of wireless spectrum desired, a bid price associated with the wireless spectrum, a start time at which the wireless spectrum is desired, and an end time at which the wireless spectrum is desired. In some embodiments, a range of time (for example, 15 seconds) may be indicated in the demand information instead of a start time and a stop time. Other techniques for designating a period of time during which utilization of wireless spectrum may be desired may be used in other examples.

The spectrum allocation device 310 may also receive spectrum supply information 315 from the primary spectrum devices 340. Examples of the supply information 315 are shown in FIGS. 4A and 4B. FIG. 4B depicts an example 10-second supply of 145 MHz of wireless spectrum that is available from 10:00:01 AM until 10:00:11 AM in 10 distinct time slots, as shown. Thus, the 145 MHz supply may be apportioned over the 10-second duration during which it is available. Various other information may be associated with each time slot (for example, each one-second time slot shown in FIG. 4B). The information may include, but is not limited to, a price (for example, a minimum price required to purchase the wireless spectrum), a geographical location associated with the wireless spectrum, the amount of wireless spectrum, a start time at which utilization of the wireless spectrum may begin, and a stop time at which utilization of the wireless spectrum ends.

Further to the description in FIG. 4A, varying amounts of the wireless spectrum may be available during different time slots, for example, 48 MHz of wireless spectrum is available from 10:01 AM to 11:00 AM, whereas 40 MHz of wireless spectrum is available from 12:00 AM to 1:00 AM. In some embodiments, the same amount of wireless spectrum may be available for each time slot. Additional information associated with the 48 MHz wireless spectrum associated with the time slot 10:01 AM to 11:00 AM may include a $45,000 minimum purchase price and a geographical location of Grid 1A. The geographical location may correspond to particular coordinates or other identifications of particular locations or areas, in at least some examples.

The example supply information in FIG. 4A may indicate a current and a future supply of available wireless spectrum. For example, the start time from 12:00 AM to 1:00 AM may represent the current supply (for example, 40 MHz as shown on the same grid line for the time slot), and the remaining time slots 1:01 AM to 12:00 PM may indicate a future supply of available wireless spectrum, having respective amounts of wireless spectrum as indicated on the same line. In this way, a vector of current and future wireless supply may be used to determine an allocation of available wireless spectrum supply for the current time slot (for example, associated with the next interval of propagation) and the future time slots, in certain embodiments.

FIG. 4A shows an example of apportioning available wireless supply. Wireless spectrum may be apportioned according to different durations of time. For example, time may be apportioned over a second, a day, a week, a month, a year, etc. Any division or apportionment of a certain amount of wireless spectrum supplied by the primary spectrum device 340 over a certain period of time may exist in other examples.

In some embodiments, a certain amount of wireless spectrum may be apportioned according to the time at which an auction occurs. For example, an auction may occur once every hour. The supply information in FIG. 4A may be applicable to this example in the way that the 576 MHz supply of wireless spectrum may be apportioned in chunks or portions for each second that the wireless spectrum is available. In this way, an auction may be implemented to allocate each portion of available wireless spectrum. The primary spectrum device 340 (for example, via the spectrum supply module 254) or the spectrum allocation device 310 (for example, via the spectrum supply monitoring module 236) may determine each portion, for example, based on historical demand information, as described above.

The above example supply information in FIG. 4A is for purposes of illustration and is not meant to be limiting. Various other information, configurations, etc., may exist in other embodiments. For example, some embodiments may not include a minimum purchase price but may rely instead on an auction to determine the price of the wireless spectrum. Also, a different number of time slots with different durations, etc., may exist in other examples.

Returning to FIG. 3, an example of determining an allocation of wireless spectrum may be as follows. An auction may occur according to the supply information shown in FIG. 4A. For example, an auction may occur once per hour at the start times indicated in FIG. 4A (12:00 AM to 1:00 AM) and for the amount of wireless spectrum indicated (40 MHz). Bids of $26,000, $28,000, and $26,400 may be received for the wireless spectrum from the operator device 360a, the operator device 360b, and the operator device 360c, respectively. In one embodiment, the spectrum allocation device 310 (for example, via the auction module 230) may compare the bid prices to determine the winning bidder. In one aspect of the embodiment, the winning bidder may be the bidder that submitted the highest bid price, for example, operator device 360b in the present example.

In some embodiments, the highest bid price may be subject to a minimum purchase price (for example, the price of $25,000) as shown for the applicable time slot and amount of wireless spectrum in the present example. For example, if the highest bid is greater than the minimum purchase price, then the operator device that submitted the highest bid price may be determined to be the winning bidder. In other examples, if the highest bid is less than the minimum required purchase price, then the spectrum allocation device 310 may send a request to the operator devices 360a, 360b, and 360c that their respective bids were too low, to which the operator devices may respond by submitting higher bids.

In yet other examples, a minimum purchase price may not be used. In these examples, the operator device that submits the highest bid may be determined to be the winning bidder. In other examples, the highest bid may not be determined to be the winning bid. Various other considerations may be used, such as those associated with various types of auctions including, but not limited to, forward auctions, such as an English auction, a Dutch auction, a Japanese auction, a Yankee auction, etc.; reverse auctions; a combination of a forward and a reverse auction (for example, a Forward-Reverse auction); and second-price sealed-bid auctions (for example, Vickrey auctions). Any one or a combination of more than one of these auctions may be used in some embodiments.

To facilitate certain auctions, the spectrum allocation device 310 may send one or more requests for bids to determine a winning bidder. For example, the spectrum allocation device 310 may submit such requests for auctions in which bids increase in value until a winning bidder is determined. In some embodiments, a first submission of demand information from an operator device 360a, 360b, or 360c may include a list of bid prices that increase in value. According to these embodiments, the spectrum allocation device 310 may parse the available bid prices and submit each of them in an auction until the winning bidder is determined. Various other techniques may be used in other embodiments to facilitate determining a winning bidder for the various types of auctions that may be implemented herein.

The spectrum allocation device 310 may send a message associated with the results of the auction to one or more of the operator devices 360a, 360b, and 360c. The winning bidder, the operator device 360b in the present example, may receive a message including configuration information, as shown. Example configuration information may include, but is not limited to, an amount of wireless spectrum to be allocated for utilization by the operator device 360b (or a winning operator device), one or more frequencies associated with the wireless spectrum, a time range for which the wireless spectrum may be utilized, an authentication code that may be required to access the wireless spectrum, and/or other information that may facilitate configuring a wireless network associated with the operator device 360b (for example, the operator network 140 in FIG. 1).

The spectrum allocation device 310 may further send various information to the primary spectrum device 340, as shown in FIG. 3. The information may include historical demand data, which may include information associated with historical demand for wireless spectrum. As described above, such information may be used to determine parameters associated with available wireless spectrum supply. The information may also include information associated with the results of an auction, such as an identification of the operator devices that participated in the auction, respective bid prices submitted in the auction, the winning bid price submitted in the auction, etc.

The above example auction may continue each hour, or at different intervals of time. As shown in FIG. 4A, another auction may occur at 10:00 AM for access to 48 MHz of wireless spectrum between 10:01 AM and 11:00 AM. The spectrum allocation device 310 may receive bids of $46,500, $49,000, and $45,000 associated with the operator devices 360a, 360b, and 360c, respectively, and compare the bids using various types of auction techniques to determine a winning bidder, as described above.

In one embodiment, wireless spectrum may be allocated based on future demand for wireless spectrum. In these embodiments, an operator device may submit a demand schedule periodically until a future point in time occurs at which an auction may be implemented. At that time, the auction may consider the demand schedule in aggregate to determine an allocation for the wireless spectrum, according to one embodiment.

For example, an auction may occur once every 10 seconds to allocate 145 MHz of wireless spectrum for utilization between 10:00:01 AM and 10:00:11 AM, as shown in the supply information 405 in FIG. 4B. The operator devices 360a, 360b, and 360c may submit a demand schedule that includes forecasted demand for 10 seconds in the future. Such demand may be submitted at a particular interval (for example, once every second) until the auction occurs. The demand schedule 420 in FIG. 4B illustrates an example forecasted demand for the operator device 360b. As shown, for each second between 10:00:01 and 10:00:11, the operator device 360b may demand an amount of wireless spectrum as indicated. Further, for each second that a demand is determined, a bid price may be submitted, as indicated. In one embodiment, the demand management module 274 in FIG. 2 may determine such demand information.

Upon receiving the demand schedule 420 information, the spectrum allocation device 310 (for example, via the allocation determination module 228 in FIG. 2) may determine a representative bid for the 10-second, demand forecast information received from the operator device 360b. In one embodiment, at least a portion of the demand forecast information may be averaged to determine the representative bid. For example, the amount of wireless spectrum desired and the associated bid prices may be averaged to determine the representative bid. In the present example, averaging such information in FIG. 4B may yield an amount of wireless spectrum of 15 MHz and a bid price of $6,000. A weighted average and/or other mathematical or statistical techniques may be used to determine aggregate or representative demand information in other examples.

The spectrum allocation device 310 may perform an auction comparing the $6,000 bid price submitted by operator device 360b to the $5,500 bid price submitted by operator device 360a for utilization of 15 MHz of wireless spectrum between 10:00:01 and 10:00:11, and the $5,300 bid price submitted by operator device 360c for utilization of 15 MHz of wireless spectrum between 10:00:01 and 10:00:11. According to one type of auction, the highest bid price of $6,000 submitted by the operator device 360b may be determined to be the winning bid. As a result, the spectrum allocation device 310 may send configuration information to the operator device 360b, which may use the configuration information to reconfigure its respective operator network to utilize the 15 MHz of wireless spectrum, as described above. In the manner described above, a winning bidder may be determined for each 10-second interval at which the auction is implemented.

The above example is non-limiting. Other examples may involve, for example, different amounts of wireless spectrum, different bid prices, different time intervals, etc. In some examples, the operator devices 360a, 360b, and 360c may submit bids for different amounts of wireless spectrum and for different durations of time. In one embodiment, the auction module 230 may identify overlapping portions of time durations and perform other determinations to match bids with an available supply of wireless spectrum to allocate the wireless spectrum. In some embodiments, the operator devices that may participate in an allocation determination for wireless spectrum may participate according to certain predefined parameters or requirements, such as the auction time interval, a particular amount of wireless spectrum on which the participants may bid, and various other information.

In addition to various types of auctions, other techniques may be used to determine an allocation of wireless spectrum. Such techniques may consider various factors, such as time (for example, utilization time of wireless spectrum), operator network operational parameters, historical data, and various mathematical techniques, as non-limiting examples.

For example, based on time considerations, wireless spectrum may be allocated to operator devices 360a, 360b, and 360c on a first-come, first-served basis such that the first operator device that requests wireless spectrum receives the wireless spectrum. As another example, wireless spectrum may be allocated among operator devices (and their respective operator networks) according to a predetermined schedule. For example, each operator network may receive a particular amount of wireless spectrum on a certain day of the week. The schedule may be rotated among the operator networks such that each operator network may receive the same amount of wireless spectrum over a longer period of time, in one embodiment. In this way, each operator network may have access to a known amount of wireless spectrum and may offer wireless services accordingly.

Network operational parameters that may be used to allocate wireless spectrum may include a number of users or customers associated with an operator network, a number of registered base stations, and a number of outages that occurred in the operator network. According to one example, wireless spectrum may be allocated proportionately to a number of customers. For example, if 576 MHz of wireless spectrum is available and operator device 360a has 1 million customers, operator device 360b has 3 million customers, and operator device 360c has 2 million customers, then approximately 17% of the 576 MHz may be allocated to the operator device 360a (1 million customers/6 million total customers), approximately 50% of the 576 MHz may be allocated to the operator device 360b (3 million customers/6 million total customers), and approximately 33% of the 576 MHz may be allocated to the operator device 360c (2 million customers/6 million total customers). Thus, operator device 360a may receive approximately 98 MHz of the available 576 MHz, operator device 360b may receive approximately 288 MHz, and operator device 360c may receive approximately 190 MHz. In one embodiment, the spectrum allocation device 310 may receive such information in demand information received from the operator device. The above example in not meant to be limiting. Numerous other examples using different mathematical or statistical techniques to determine an allocation may be used.

Similarly, an allocation of wireless spectrum may be determined based on a registered number of base stations associated with each operator device, or a number of outages associated with each operator device (or its respective operator network). For example, an operator device associated with a relatively larger number of base stations may receive a relatively larger amount of wireless spectrum. An operator device associated with fewer outages may receive a relatively larger amount of wireless spectrum, according to another example. In this way, operator devices (or their respective operator networks) that experience less downtime or inability to serve customers may receive the benefit of a relatively larger amount of wireless spectrum. The number of base stations, outage information, and other information may be received by the spectrum allocation device 310 in the demand information described above, in one embodiment.

Various historical information may also be used to determine an allocation of wireless spectrum, such as the historical amount of wireless spectrum requested, bid prices associated with the historical requests, etc. In one embodiment, an average, weighted average, etc., for such historical data may be used to determine the allocation. For example, an operator device that has requested more wireless spectrum on average may receive a relatively larger amount of wireless spectrum. Numerous other examples that include other historical information or data, other mathematical techniques, statistical techniques, etc., for determining an allocation of wireless spectrum may also exist.

As mentioned, various other mathematical or statistical techniques may be used to determine an allocation of wireless spectrum. Such techniques may include linear, quadratic, or other order functions. A non-limiting example technique may include the Bertsekas and Castanon forward/reverse auction algorithm.

Figure 5:
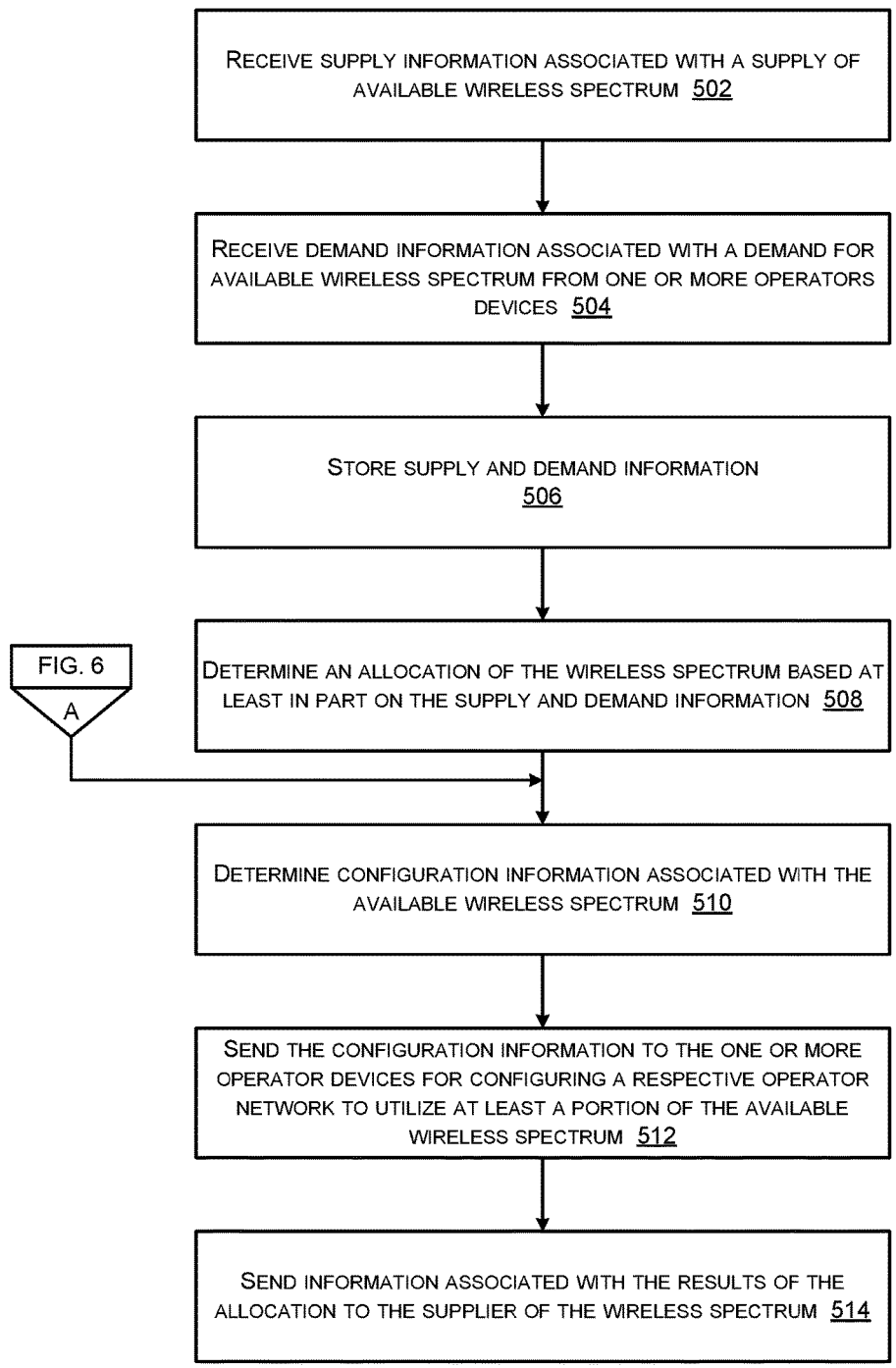
FIG. 5 illustrates a flow diagram of an example process for determining an allocation of wireless spectrum, according to an embodiment of the disclosure.

FIG. 5 illustrates a flow diagram of an example process 500 for determining an allocation of wireless spectrum, according to an embodiment of the disclosure. In one embodiment, the example process may be performed by the spectrum allocation device 210 in FIG. 2. The example process may begin at block 502, where information associated with a supply of available wireless spectrum ("supply information") is received (for example, via the communication module 226). Information associated with one or more demands or requests for the available wireless spectrum ("demand information") may also be received, at block 504. The supply information and the demand information may be stored (for example, via the allocation determination module 228) at block 506. Storage of such information may facilitate certain determinations described herein, such as allocations of wireless spectrum and the determination of supply information associated with wireless spectrum.

Figure 6:
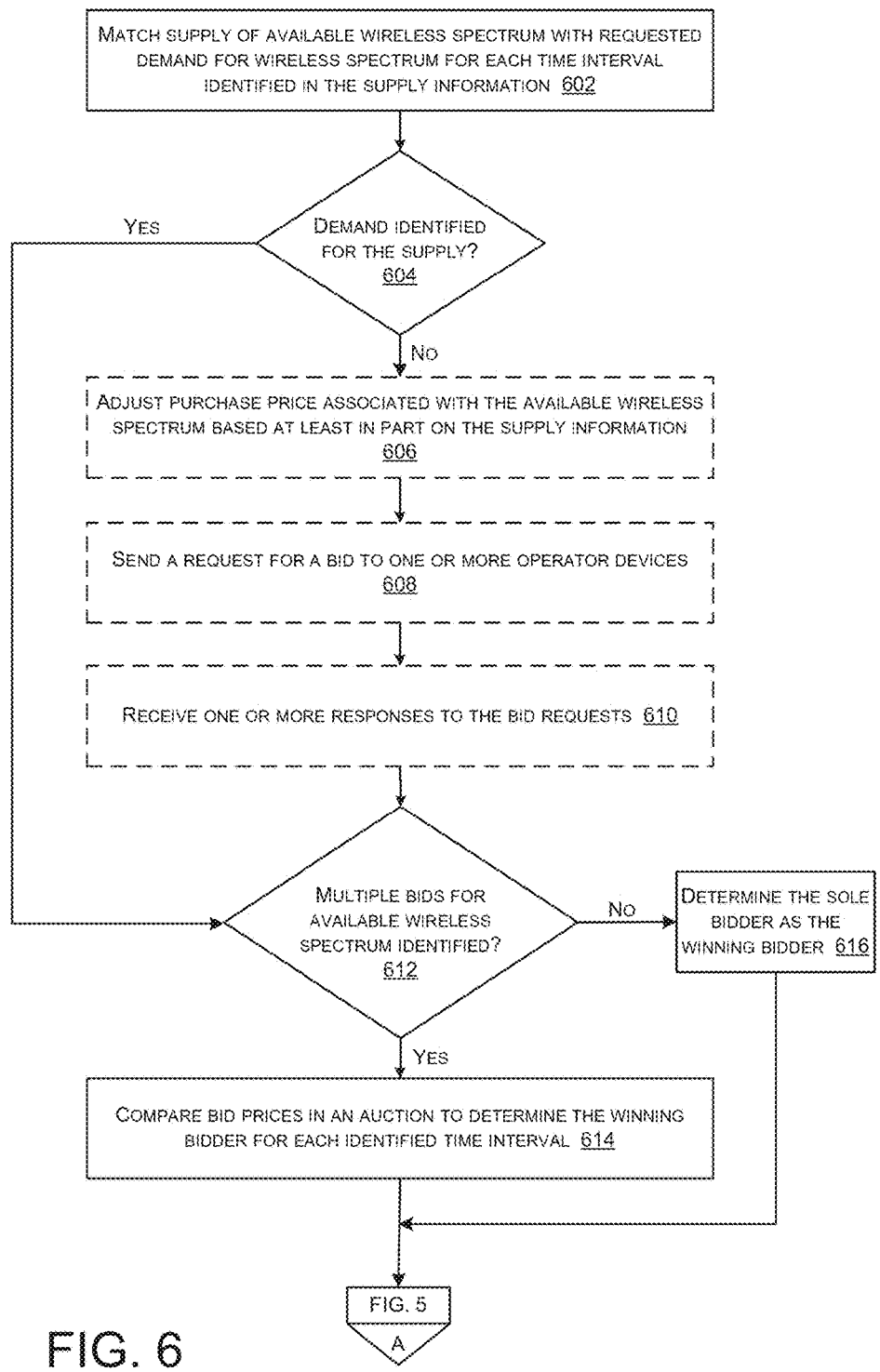
FIG. 6 illustrates a flow diagram of an example process for determining allocation of wireless spectrum based on an auction, according to an embodiment of the disclosure.

At block 508, an allocation of the available wireless spectrum may be determined based at least in part on the supply information and the demand information. Various techniques may be used to determine such an allocation. For example, FIG. 6 depicts a diagram of an example process 508 for determining an allocation of wireless spectrum based on an auction. The example process may begin at block 602, where a supply of the available wireless spectrum may be matched with demand for the available wireless spectrum. In one example, each time interval identified in supply information associated with the available wireless spectrum may be compared to time intervals identified in the demand information (for example, a time at which an operator network 140 in FIG. 1 desired to utilize a requested amount of wireless spectrum). In one embodiment, overlapping time intervals, or otherwise equivalent time intervals, in such information may indicate that an operator network desires wireless spectrum during a duration in which it is available, and hence, an auction may commence for the wireless spectrum for the applicable time interval.

If the available wireless spectrum is determined to be demanded or requested, at block 604, then a further determination may be made as to whether multiple bids for the available wireless spectrum were received, at block 612. If multiple bids were received, then bid prices associated with the multiple bids may be compared to determine a winning bidder of the available wireless spectrum (for example, an operator device 260 associated with a respective operator network 140) at block 614. The comparison may be based on criteria for various types of auctions, such as those mentioned above. In one example, the highest bidder may be determined to be the winning bidder of the available wireless spectrum. In some embodiments, bid prices submitted in an auction may be subjected to a minimum purchase price, which may be specified by the primary spectrum device 240 in FIG. 2. In these embodiments, the highest bid price may be required to be greater than or equal to the minimum purchase price if it is to be determined as the winning bid. In other embodiments, a minimum purchase price may not be required, and the winning bid may be the highest bid or the bid that meets some other criteria, which may be determined based on the type of auction being implemented.

In examples in which only one bid for the available wireless spectrum was received, then the sole bidder (or operator device 260) may be determined to be the winning bidder (at block 616), and all or at least a portion of the available wireless spectrum may be allocated to the sole bidder. Processing may then return to block 512 of FIG. 5, as shown in this embodiment.

If a demand for the available wireless spectrum is not determined, at block 604, then adjustments may be made (for example, by the allocation determination module 228) to attempt to increase demand for the available wireless spectrum. As an example, a purchase price for the available wireless spectrum may be adjusted (for example, reduced) to make it more attractive to one or more operator networks for purchase, at block 606. At block 608, a request for a bid may be sent to the one or more operator networks. The request may include various information, such as the adjusted purchase price for the available wireless spectrum and other supply information associated with the available wireless spectrum. One or more responses to the request may be received, at block 610.

Figure 7:
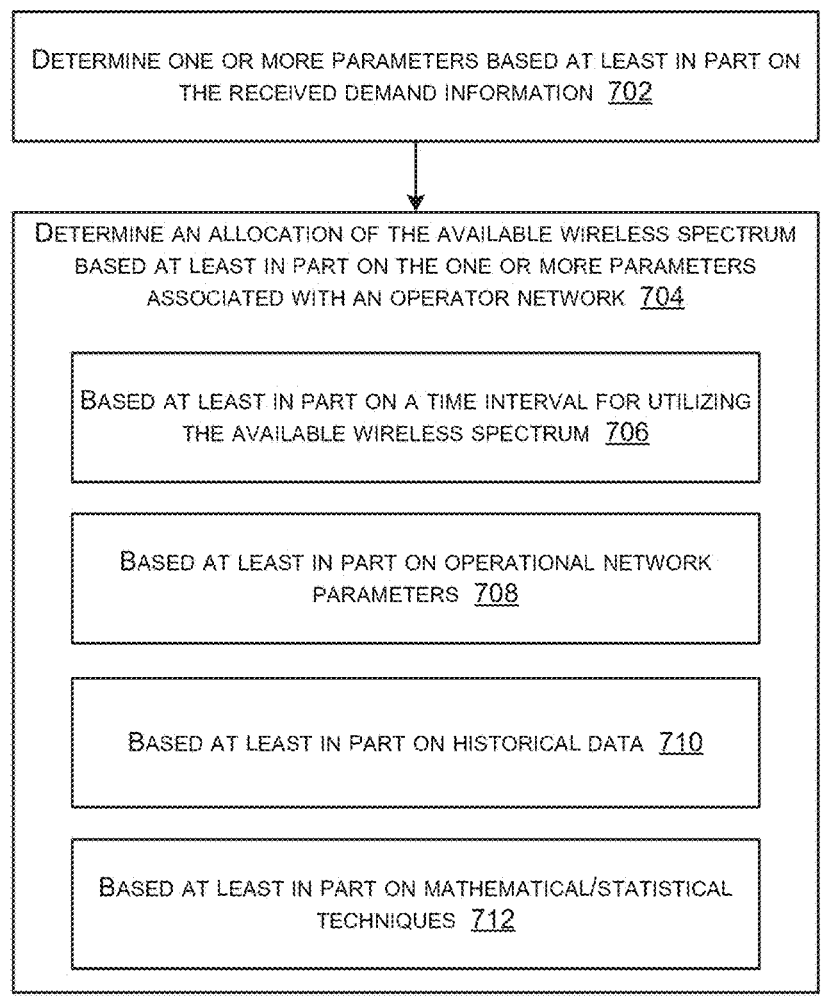
FIG. 7 illustrates a flow diagram of other example processes for determining an allocation of wireless spectrum, according to an embodiment of the disclosure.

Another example process 508 may exist as shown in FIG. 7, which depicts a flow diagram of an example process for allocating wireless spectrum according to various other techniques. The example process may begin at block 702, where one or more parameters may be identified in the received demand information. Such parameters may be associated with a time associated with utilizing wireless spectrum (block 706), operational parameters associated with an operator device 260 or its respective operator network 140 (block 708), historical data associated with an operator network (block 710), and various mathematical and/or statistical techniques (block 712), as non-limiting examples. An allocation of the available wireless spectrum based at least in part on such parameters associated with an operator network may be determined at block 704. In some embodiments, any one parameter or a combination of multiple parameters may be used to determine an allocation of wireless spectrum.

Returning to FIG. 5, configuration information associated with the available wireless spectrum may be determined at block 510. As described, such configuration information may configure an operator network to utilize the available wireless spectrum. In one example, each operator device 260 that receives configuration information associated with at least a portion of the available wireless spectrum may implement or facilitate configuration of its respective operator network to use the wireless spectrum. For example, if operator device 360a is allocated 10 MHz of wireless spectrum corresponding to frequencies 790 MHz to 800 MHz, and operator device 360b is allocated 15 MHz of wireless spectrum corresponding to frequencies 801 MHz to 814 MHz, then operator device 360a may receive configuration information that may allow it to configure its respective operator network to utilize frequencies 790 MHz to 800 MHz. Similarly, operator device 360b may receive configuration information that may allow it to configure its respective operator network to utilize frequencies 801 MHz to 814 MHz. Numerous other examples exist.

The configuration information may be sent to the one or more operator devices based on the allocation determination for configuring one or more respective operator networks, at block 512. Information associated with the allocation determination, such as the results of an auction, may be sent to the supplier of the wireless spectrum (for example, the primary spectrum device 240), at block 514.

Figure 8:
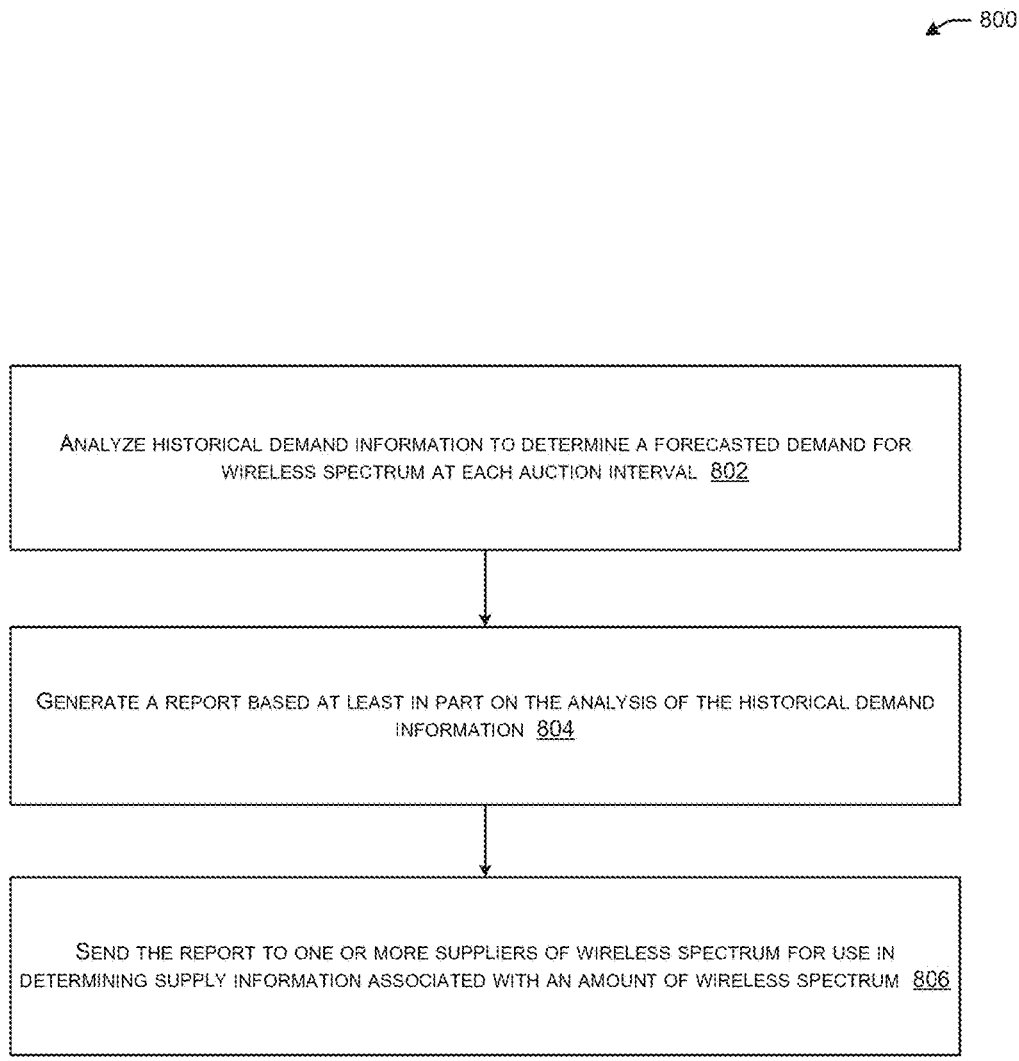
FIG. 8 illustrates a flow diagram of an example process for determining supply information associated with wireless spectrum, according to an embodiment of the disclosure.

FIG. 8 depicts a flow diagram of an example process 800 for determining supply information associated with wireless spectrum, according to an embodiment of the disclosure. In one embodiment, the determination may be implemented by the spectrum allocation device 210. The example process 800 may begin at block 802, where information associated with a demand for wireless spectrum may be analyzed to determine a forecasted demand for the wireless spectrum. Example demand information included in the analysis may be a total amount of wireless spectrum previously demanded or requested, historical bid prices received in previous auctions for the wireless spectrum, or other data that may indicate historical demand for wireless spectrum. A report that includes the results of the analysis of the demand information may be generated, at block 804, and may be sent to one or more suppliers of wireless spectrum for use in determining supply information associated with an amount of available wireless spectrum, at block 806. In one embodiment, the determination in FIG. 8 may be performed prior to block 502 in FIG. 5, where the supply information received may be based on the determination in FIG. 8.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation. The patentable scope of certain embodiments of the present disclosure is defined in the claims, and may include other examples that occur to those skilled in the art.

According to an example embodiment, there is disclosed a method for allocating wireless spectrum. The method may include receiving, by a spectrum allocation system comprising one or more computers, from one or more suppliers of wireless spectrum, supply information associated with an available wireless spectrum; receiving, by the spectrum allocation system, from one or more operator networks, demand information associated with the available wireless spectrum; determining, by the spectrum allocation system, an allocation of at least a portion of the available wireless spectrum to at least one of the one or more operator networks based at least in part on the supply information and the demand information; and sending, by the spectrum allocation system, configuration information associated with the portion of the available wireless spectrum for configuring the at least one of the one or more operator networks for communication via the portion of the available wireless spectrum.

Various aspects of the example embodiment may exist. For example, the demand information may comprise one or more respective bid prices; determining the allocation may comprise comparing the one or more respective bid prices from respective operator networks to determine a winning bidder; and the comparison may be associated with an auction for at least the portion of the available wireless spectrum.

In another aspect of the example embodiment, the determination may comprise allocating a first portion of the available wireless spectrum to a first operator device of a first operator network of the one or more operator networks, and a second portion of the available wireless spectrum to a second operator device of a second operator network of the one or more operator networks. In one embodiment, the determination may be based at least in part on at least one of a number of user devices associated with the one or more operator networks, a number of network outages associated with the one or more operator networks, or a number of base stations associated with the one or more operator networks. In other embodiments, the determination may also, or as an alternative, be based at least in part on at least one of a time period for utilizing the available wireless spectrum, one or more respective operational network parameters associated with the one or more operator networks, or historical demand information.

In another example embodiment, the method may further include determining, by the spectrum allocation system, a demand forecast for at least the portion of the available wireless spectrum based at least in part on historical demand information, and sending, by the spectrum allocation system, the demand forecast to the one or more suppliers of wireless spectrum. In one aspect, the available wireless spectrum may be associated with cellular communication.

In one embodiment, the demand information may comprise at least one of a requested portion of the available wireless spectrum, an identification of the one or more operator networks, or a time period during which the requested portion of the available wireless spectrum is desired.

In one embodiment, the supply information comprises at least one of an amount of the available wireless spectrum, one or more frequencies associated with the available wireless spectrum, a geographical location associated with the available wireless spectrum, a start time at which use of the available wireless spectrum begins, an end time at which use of the available wireless spectrum ends, or a price associated with the available wireless spectrum. The configuration information may comprise at least one of one or more frequencies corresponding to the portion of the available wireless spectrum, an authentication code for accessing the one or more frequencies, or a time period during which the portion of the available wireless spectrum may be utilized.

In another example embodiment, there is disclosed a method for allocating wireless spectrum that comprises receiving, by a spectrum allocation system comprising one or more computers, supply information associated with at least a portion of wireless spectrum; receiving, by the spectrum allocation system, from a first operator network first demand information for the portion of wireless spectrum, and from a second operator network second demand information for the portion of wireless spectrum; and determining, by the spectrum allocation system, an allocation of the portion of wireless spectrum to the first operator network based at least in part on the supply information and the first demand information.

In another example embodiment, the method may further comprise, in response to the determination, sending configuration information associated with the portion of wireless spectrum for configuring the first operator network for communication via the portion of wireless spectrum.

In one embodiment, the portion of wireless spectrum comprises a first portion of wireless spectrum, and the determination comprises allocating a second portion of wireless spectrum to the second operator network.

In one embodiment, the determination may be based at least in part on at least one of a number of user devices associated with the first operator network, a number of network outages associated with the first operator network, or a number of base stations associated with the first operator network.

In one embodiment, the configuration information may comprise at least one of one or more frequencies corresponding to the portion of wireless spectrum, an authentication code for accessing the one or more frequencies, or a time period during which the portion of wireless spectrum may be utilized.

In another example embodiment, the method may further comprise determining, by the spectrum allocation system, a demand forecast for the portion of wireless spectrum based at least in part on historical demand information, and sending, by the spectrum allocation system, the demand forecast to one or more suppliers of wireless spectrum.

In another example embodiment, there is disclosed a system for allocating wireless spectrum. The system may include at least one memory that stores computer-executable instructions and at least one processor configured to access the at least one memory, wherein the at least one processor is configured to execute the computer-executable instructions to receive, from one or more suppliers of wireless spectrum, supply information associated with available wireless spectrum; receive, from one or more operator networks, respective demand information associated with the available wireless spectrum, wherein the respective demand information each comprises one or more respective bids for at least a portion of the available wireless spectrum; determine a winning bidder of the one or more operator networks based at least in part on a comparison of the one or more respective bids; and send configuration information to an operator network associated with the winning bidder for configuring the operator network for communication via the portion of the available wireless spectrum.

According to one configuration, the system may further comprise a networking component that configures a mobile device associated with the first operator network to communicate over the portion of the available wireless spectrum. In one embodiment, the first operator network may comprise at least one device that communicates with at least one base station associated with the mobile device.

In another example embodiment, the at least one processor may be further configured to execute the computer-executable instructions to compare a bid price associated with the winning bidder to a purchase price associated with the supply information. In various embodiments, the bid price may be the same or greater than the purchase price. In various embodiments, the comparison of the one or more respective bids may occur at a predetermined recurring time interval. Also in various embodiments, the comparison may be performed in association with an auction for the portion of the available wireless spectrum.

In another example embodiment, the supply information may comprise a first forecast of at least the portion of the available wireless spectrum, and the demand information may comprise a second forecast of at least the portion of the available wireless spectrum. In one aspect of an embodiment, the determination may comprise determining the one or more respective bids based at least in part on a comparison of respective time intervals in the first forecast and the second forecast.

In another example embodiment, the portion of the available wireless spectrum may comprise a first portion of the available wireless spectrum. The at least one processor may be further configured to execute the computer-executable instructions to determine that a second portion of the available wireless spectrum is not demanded based at least in part on the second demand information, send a request for bids to at least a portion of the one or more operator networks, and receive, from the at least a portion of the one or more operator networks, a respective response each comprising a bid.

In another example embodiment, there is disclosed a device for allocating wireless spectrum. According to one embodiment, the device comprises at least one memory that stores computer-executable instructions, and at least one processor configured to access the at least one memory, wherein the at least one processor is configured to execute the computer-executable instructions to receive supply information associated with available wireless spectrum; receive demand information comprising a request for at least a portion of the available wireless spectrum; and determine an allocation of the available wireless spectrum among one or more operator networks based at least in part on the supply information and the demand information.

In certain embodiments, the at least one processor may be further configured to execute the computer-executable instructions to, in response to the determination, send configuration information associated with the available wireless spectrum for configuring the one or more operator networks for communication via at least a portion of the available wireless spectrum. The determination may include allocating a first portion of the available wireless spectrum to a first operator device of the one or more operator networks and a second portion of the available wireless spectrum to a second operator device of the one or more operator networks. The first portion and the second portion may be based at least in part on at least one of a number of user devices associated with the one or more operator networks, a number of network outages associated with the one or more operator networks, or a number of base stations associated with the one or more operator networks.

In one embodiment, the configuration information may comprise at least one of one or more frequencies corresponding to the available wireless spectrum, an authentication code for accessing the one or more frequencies, or a time period during which the available wireless spectrum may be utilized.

In another example embodiment, the at least one processor further configured to execute the computer-executable instructions to determine a demand forecast for the available wireless spectrum based at least in part on historical demand information, and send the demand forecast to one or more suppliers of the available wireless spectrum. In one embodiment, the information may be based at least in part on the demand forecast.

In another example embodiment, there is disclosed an apparatus for allocating wireless spectrum. The apparatus may comprise means for receiving, from one or more suppliers of wireless spectrum, supply information associated with available wireless spectrum; means for receiving, from one or more operator networks, demand information associated with the available wireless spectrum; means for determining an allocation of the available wireless spectrum for the one or more operator networks based at least in part on the supply information and the demand information; and means for sending configuration information associated with the available wireless spectrum for configuring the one or more operator networks for communication via at least a portion of the available wireless spectrum.

Various aspects of the example embodiment may exist. For example, the demand information may comprise one or more respective bid prices; means for determining the allocation may comprise means for comparing the one or more respective bid prices to determine a winning bidder; and the comparison may be associated with an auction for the available wireless spectrum. In another aspect of the example embodiment, the means for determining may comprise means for allocating a first portion of the available wireless spectrum to a first operator device of the one or more operator networks and a second portion of the available wireless spectrum to a second operator device of the one or more operator networks. The first portion and the second portion are based at least in part on at least one of a number of user devices associated with the one or more operator networks, a number of network outages associated with the one or more operator networks, or a number of base stations associated with the one or more operator networks.

In another aspect of the example embodiment, the determination may be based at least in part on at least one of a time period for utilizing the available wireless spectrum, one or more operational network parameters associated with the operator network, or historical demand information.

Another example embodiment may include means for determining a demand forecast for the available wireless spectrum based at least in part on historical demand information, and means for sending the demand forecast to the one or more suppliers of wireless spectrum. In one aspect, the wireless spectrum may be associated with cellular communication.

In other example embodiments, the demand information may comprise at least one of a requested amount of the wireless spectrum, an identification of the one or more operator networks, or a time period during which the requested amount of wireless spectrum is desired. The supply information may comprise at least one of an amount of the available wireless spectrum, one or more frequencies associated with the available wireless spectrum, a geographical location associated with the available wireless spectrum, a start time at which use of the available wireless spectrum begins, an end time at which use of the available wireless spectrum ends, or a price associated with the available wireless spectrum. The configuration information may comprise at least one of one or more frequencies corresponding to the available wireless spectrum, an authentication code for accessing the one or more frequencies, or a time period during which the available wireless spectrum may be utilized.

In another example embodiment, there is disclosed an apparatus for allocating wireless spectrum that comprises at least one memory that stores computer-executable instructions, and at least one processor configured to access the at least one memory, wherein the at least one processor is configured to execute the computer-executable instructions to receive supply information associated with available wireless spectrum; receive demand information comprising a request for at least a portion of the available wireless spectrum; and determine an allocation of the available wireless spectrum among one or more operator networks based at least in part on the supply information and the demand information.

In certain embodiments, the at least one processor may be further configured to execute the computer-executable instructions to, in response to the determination, send configuration information associated with the available wireless spectrum for configuring the one or more operator networks for communication via at least a portion of the available wireless spectrum. The determination may comprise the at least one processor being further configured to execute the computer-executable instructions to allocate a first portion of the available wireless spectrum to a first operator device of the one or more operator networks and a second portion of the available wireless spectrum to a second operator device of the one or more operator networks. The first portion and the second portion may be based at least in part on at least one of a number of user devices associated with the one or more operator networks, a number of network outages associated with the one or more operator networks, or a number of base stations associated with the one or more operator networks.

In another example embodiment, the at least one processor may be further configured to execute the computer-executable instructions to determine a demand forecast for the available wireless spectrum based at least in part on historical demand information, and send the demand forecast to one or more suppliers of the available wireless spectrum. In one embodiment, the information may be based at least in part on the demand forecast.

According to another example embodiment, there is disclosed one or more computer-readable media storing computer-executable instructions that, when executed by at least one processor, configure the at least one processor to perform operations comprising receiving, from one or more suppliers of wireless spectrum, supply information associated with available wireless spectrum; receiving, from one or more operator networks, demand information associated with the available wireless spectrum; determining an allocation of the available wireless spectrum for the one or more operator networks based at least in part on the supply information and the demand information; and sending configuration information associated with the available wireless spectrum for configuring the one or more operator networks for communication via at least a portion of the available wireless spectrum.

Various aspects of the example embodiment may exist. For example, the demand information may comprise one or more respective bid prices; determining the allocation may comprise comparing the one or more respective bid prices to determine a winning bidder; and the comparison may be associated with an auction for the available wireless spectrum. In another aspect of the example embodiment, the determination may comprise allocating a first portion of the available wireless spectrum to a first operator device of the one or more operator networks and a second portion of the available wireless spectrum to a second operator device of the one or more operator networks. The first portion and the second portion are based at least in part on at least one of a number of user devices associated with the one or more operator networks, a number of network outages associated with the one or more operator networks, or a number of base stations associated with the one or more operator networks.

In another aspect of the example embodiment, the determination may be based at least in part on at least one of a time period for utilizing the available wireless spectrum, one or more operational network parameters associated with the operator network, or historical demand information.

In another example embodiment, the at least one processor may be further configured to execute the computer-executable instructions to perform the operations comprising determining a demand forecast for the available wireless spectrum based at least in part on historical demand information, and sending the demand forecast to the one or more suppliers of wireless spectrum. In one aspect, the wireless spectrum may be associated with cellular communication.

In other example embodiments, the demand information may comprise at least one of a requested amount of the wireless spectrum, an identification of the one or more operator networks, or a time period during which the requested amount of wireless spectrum is desired. The supply information may comprise at least one of an amount of the available wireless spectrum, one or more frequencies associated with the available wireless spectrum, a geographical location associated with the available wireless spectrum, a start time at which use of the available wireless spectrum begins, an end time at which use of the available wireless spectrum ends, or a price associated with the available wireless spectrum. The configuration information may comprise at least one of one or more frequencies corresponding to the available wireless spectrum, an authentication code for accessing the one or more frequencies, or a time period during which the available wireless spectrum may be utilized.

In another example embodiment, there is disclosed a computer-readable media storing computer-executable instructions that, when executed by at least one processor, configure the at least one processor to perform operations comprising receiving supply information associated with available wireless spectrum; receiving demand information comprising a request for at least a portion of the available wireless spectrum; and determining an allocation of the available wireless spectrum among one or more operator networks based at least in part on the supply information and the demand information.

In certain embodiments, the at least one processor may be further configured to perform the operations comprising, in response to the determination, sending configuration information associated with the available wireless spectrum for configuring the one or more operator networks for communication via at least a portion of the available wireless spectrum. In one embodiment, the determination may also include allocating a first portion of the available wireless spectrum to a first operator device of the one or more operator networks and a second portion of the available wireless spectrum to a second operator device of the one or more operator networks. The first portion and the second portion may be based at least in part on at least one of a number of user devices associated with the one or more operator networks, a number of network outages associated with the one or more operator networks, or a number of base stations associated with the one or more operator networks.

In one embodiment, the configuration information may comprise at least one of one or more frequencies corresponding to the available wireless spectrum, an authentication code for accessing the one or more frequencies, or a time period during which the available wireless spectrum may be utilized.

In another example embodiment, the at least one processor may be further configured to execute the computer-executable instructions to determine a demand forecast for the available wireless spectrum based at least in part on historical demand information, and send the demand forecast to one or more suppliers of the available wireless spectrum, wherein the information is based at least in part on the demand forecast.

In another example embodiment, there is disclosed a device for allocating wireless spectrum. The device may comprise at least one memory that stores computer-executable instructions and at least one processor configured to access the at least one memory, wherein the at least one processor is configured to execute the computer-executable instructions to receive, from one or more suppliers of wireless spectrum, supply information associated with available wireless spectrum; receive, from one or more operator networks, demand information associated with the wireless spectrum, wherein the demand information comprises one or more respective bids for at least a portion of the available wireless spectrum; determine a winning bidder of the one or more operator networks based at least in part on a comparison of the one or more respective bids; and send configuration information to an operator network associated with the winning bidder for configuring the operator network for communication via at least a portion of the available wireless spectrum.

In another example embodiment, the at least one processor is further configured to execute the computer-executable instructions to compare a bid price associated with the winning bidder to a purchase price associated with the supply information, wherein the bid price is the same or greater than the purchase price. The supply information may comprise a first forecast of the available wireless spectrum, and the demand information may comprise a second forecast of the demanded wireless spectrum, and wherein the determining comprises determining the one or more respective bids based at least in part on a comparison of respective time intervals in the first forecast and the second forecast. In one embodiment, the comparison of the one or more respective bids occurs at a predetermined recurring time interval. The comparison may also be performed in association with an auction for the available wireless spectrum, in various embodiments.

In one embodiment, the one or more operator networks may comprise one or more first operator networks, and wherein the at least one processor is further configured to execute the computer-executable instructions to determine that at least a portion of the available wireless spectrum is not demanded based at least in part on the demand information; send a request for bids to one or more second operator networks; and receive, from the one or more second operator networks, one or more responses comprising the one or more respective bids.

In another example embodiment, there is disclosed one or more computer-readable media storing computer-executable instructions that, when executed by at least one processor, configure the at least one processor to perform operations comprising receiving, from one or more suppliers of wireless spectrum, supply information associated with available wireless spectrum; receiving, from one or more operator networks, respective demand information associated with the available wireless spectrum, wherein the respective demand information each comprises one or more respective bids for at least a portion of the available wireless spectrum; determining a winning bidder of the one or more operator networks based at least in part on a comparison of the one or more respective bids; and sending configuration information to an operator network associated with the winning bidder for configuring the operator network for communication via the portion of the available wireless spectrum.

In one example embodiment, the at least one processor is further configured to execute the computer-executable instructions to perform the operation comprising comparing a bid price associated with the winning bidder to a purchase price associated with the supply information, wherein the bid price is the same or greater than the purchase price. In one embodiment, the comparison of the one or more respective bids occurs at a predetermined recurring time interval.

In another example embodiment, the supply information comprises a first forecast of at least the portion of the available wireless spectrum, and the demand information comprises a second forecast of at least the portion of the available wireless spectrum, and wherein the determining comprises determining the one or more respective bids based at least in part on a comparison of respective time intervals in the first forecast and the second forecast.

In another example embodiment, the portion of the available wireless spectrum comprises a first portion of the available wireless spectrum, and the at least one processor is further configured to execute the computer-executable instructions to perform the operations comprising determining that a second portion of the available wireless spectrum is not demanded based at least in part on the second demand information; sending a request for bids to the second operator network; and receiving, from the second operator network, a response comprising a bid.

In another example embodiment, there is disclosed a computer program product that includes a computer-readable medium that has computer-executable instructions embodied therein. The computer-executable instructions, when executed by at least one processor, perform the operations including receiving supply information associated with at least a portion of wireless spectrum; receiving from a first operator network first demand information for the portion of wireless spectrum, and from a second operator network second demand information for the portion of wireless spectrum; and determining an allocation of the portion of wireless spectrum to the first operator network based at least in part on the supply information and the first demand information. A further operation that may be performed includes in response to the determination, sending configuration information associated with the portion of wireless spectrum for configuring the first operator network for communication via the portion of wireless spectrum.

In one embodiment, the portion of the wireless spectrum includes a first portion of wireless spectrum, and the determination may include allocating a second portion of wireless spectrum to the second operator network. The determination may be based at least in part on at least one of a number of user devices associated with the first operator network, a number of network outages associated with the first operator network, or a number of base stations associated with the first operator network.

In one embodiment, the configuration information includes at least one of one or more frequencies corresponding to the portion of wireless spectrum, an authentication code for accessing the one or more frequencies, or a time period during which the portion of wireless spectrum may be utilized.

In another example embodiment, operations that may be further performed may include determining a demand forecast for the portion of wireless spectrum based at least in part on historical demand information and sending the demand forecast to one or more suppliers of wireless spectrum.

What is claimed is:

1. A method for allocating wireless spectrum, comprising:
   receiving, by a spectrum allocation system comprising one or more computers, from one or more suppliers of wireless spectrum, supply information associated with an available wireless spectrum, the supply information comprising a geographical location associated with the available wireless spectrum;
   receiving, by the spectrum allocation system, from one or more operator networks, demand information associated with the available wireless spectrum;
   receiving, by the spectrum allocation system, from one or more operator networks, one or more periodic demand schedules for a predetermined duration, wherein at least one of the periodic demand schedules of the one or more periodic demand schedules includes a first demand forecast for a first time, the first demand forecast being based at least in part on the demand information;
   determining, by the spectrum allocation system, an allocation of at least a portion of the available wireless spectrum to at least one of the one or more operator networks based at least in part on the supply information, the demand information, and the one or more periodic demand schedules, wherein the determination is further based at least in part on a number of network outages associated with the one or more operator networks; and
   sending, by the spectrum allocation system, configuration information associated with the portion of the available wireless spectrum for configuring the at least one of the one or more operator networks for communication via the portion of the available wireless spectrum.

2. The method of claim 1, wherein the demand information comprises one or more respective bid prices, and wherein determining the allocation comprises comparing the one or more respective bid prices from respective operator networks to determine a winning bidder.

3. The method of claim 2, wherein the comparison is associated with an auction for at least the portion of the available wireless spectrum.

4. The method of claim 1, wherein the determination comprises allocating a first portion of the available wireless spectrum to a first operator device of a first operator network of the one or more operator networks, and a second portion of the available wireless spectrum to a second operator device of a second operator network of the one or more operator networks.

5. The method of claim 1, wherein the determination is based at least in part on at least one of a time period for utilizing the available wireless spectrum, one or more respective operational network parameters associated with the one or more operator networks, or historical demand information.

6. The method of claim 1, further comprising:
   determining, by the spectrum allocation system, a demand forecast for at least the portion of the available wireless spectrum based at least in part on historical demand information; and
   sending, by the spectrum allocation system, the demand forecast to the one or more suppliers of wireless spectrum.

7. The method of claim 1, wherein the available wireless spectrum is associated with cellular communication.

8. The method of claim 1, wherein the demand information comprises at least one of a requested portion of the available wireless spectrum, an identification of the one or more operator networks, or a time period during which the requested portion of the available wireless spectrum is desired.

9. The method of claim 1, wherein the supply information comprises at least one of an amount of the available wireless spectrum, one or more frequencies associated with the available wireless spectrum, a start time at which use of the available wireless spectrum begins, an end time at which use of the available wireless spectrum ends, or a price associated with the available wireless spectrum.

10. The method of claim 1, wherein the configuration information comprises at least one of one or more frequencies corresponding to the portion of the available wireless spectrum, an authentication code for accessing the one or more frequencies, or a time period during which the portion of the available wireless spectrum may be utilized.

11. A method for allocating wireless spectrum, comprising:
    receiving, by a spectrum allocation system comprising one or more computers, supply information associated with at least a portion of wireless spectrum, the supply information comprising a geographical location associated with the wireless spectrum;
    receiving, by the spectrum allocation system, from a first operator network first demand information for the portion of wireless spectrum, and from a second operator network second demand information for the portion of wireless spectrum;
    receiving, by the spectrum allocation system, from one or more operator networks, one or more periodic demand schedules for a predetermined duration, wherein at least one of the periodic demand schedules of the one or more periodic demand schedules includes a first demand forecast for a first time, the first demand forecast being based at least in part on the demand information; and
    determining, by the spectrum allocation system, an allocation of the portion of wireless spectrum to the first operator network based at least in part on the supply information, the first demand information, and the one or more periodic demand schedules, wherein the determination is based at least in part on a number of network outages associated with the first operator network.

12. The method of claim 11, further comprising, in response to the determination, sending configuration information associated with the portion of wireless spectrum for configuring the first operator network for communication via the portion of wireless spectrum.

13. The method of claim 11, wherein the portion of wireless spectrum comprises a first portion of wireless spectrum, and wherein the determination comprises allocating a second portion of wireless spectrum to the second operator network.

14. The method of claim 12, wherein the configuration information comprises at least one of one or more frequencies corresponding to the portion of wireless spectrum, an authentication code for accessing the one or more frequencies, or a time period during which the portion of wireless spectrum may be utilized.

15. The method of claim 11, further comprising:
   determining, by the spectrum allocation system, a demand forecast for the portion of wireless spectrum based at least in part on historical demand information; and
   sending, by the spectrum allocation system, the demand forecast to one or more suppliers of wireless spectrum.

16. A system for allocating wireless spectrum, comprising:
   at least one memory that stores computer-executable instructions; and
   at least one processor configured to access the at least one memory, wherein the at least one processor is configured to execute the computer-executable instructions to:
      receive, from one or more suppliers of wireless spectrum, supply information associated with available wireless spectrum, the supply information comprising a geographical location associated with the available wireless spectrum;
      receive, from one or more operator networks, respective demand information associated with the available wireless spectrum, wherein the respective demand information each comprises one or more respective bids for at least a portion of the available wireless spectrum;
      receive, from the one or more operator networks, one or more periodic demand schedules for a predetermined duration, wherein at least one of the periodic demand schedules of the one or more periodic demand schedules includes a first demand forecast for a first time, the first demand forecast being based at least in part on the respective demand information;
      determine a winning bidder of the one or more operator networks based at least in part on a comparison of the one or more respective bids, wherein the determination is based at least in part on a number of network outages associated with the available wireless spectrum; and
      send configuration information to an operator network associated with the winning bidder for configuring the operator network for communication via the portion of the available wireless spectrum.

17. The system of claim 16, further comprising a networking component that configures a mobile device associated with the operator network to communicate over the portion of the available wireless spectrum.

18. The system of claim 17, wherein the operator network comprises at least one device, wherein the at least one device communicates with at least one base station associated with the mobile device.

19. The system of claim 16, the at least one processor further configured to execute the computer-executable instructions to compare a bid price associated with the winning bidder to a purchase price associated with the supply information, wherein the bid price is the same or greater than the purchase price.

20. The system of claim 16, wherein the supply information comprises a first forecast of at least the portion of the available wireless spectrum, and the respective demand information comprises a second forecast of at least the portion of the available wireless spectrum, and wherein the determining comprises:
   determining the one or more respective bids based at least in part on a comparison of respective time intervals in the first forecast and the second forecast.

21. The system of claim 16, wherein comparison of the one or more respective bids occurs at a predetermined recurring time interval.

22. The system of claim 16, wherein the portion of the available wireless spectrum comprises a first portion of the available wireless spectrum, and wherein the at least one processor is further configured to execute the computer-executable instructions to:
   determine that a second portion of the available wireless spectrum is not demanded based at least in part on a second demand information;
   send a request for bids to at least a portion of the one or more operator networks; and
   receive, from the at least a portion of the one or more operator networks, a respective response each comprising a bid.

23. The system of claim 16, wherein the comparison is performed in association with an auction for the portion of the available wireless spectrum.

24. A computer program product comprising a non-transitory computer-readable medium having computer-executable instructions embodied therein, the computer-executable instructions when executed by at least one processor perform operations comprising:
   receiving supply information associated with at least a portion of wireless spectrum, the supply information comprising a geographical location associated with the wireless spectrum;
   receiving from a first operator network first demand information for the portion of wireless spectrum, and from a second operator network second demand information for the portion of wireless spectrum;
   receiving from the first operator network or the second operator network, one or more periodic demand schedules for a predetermined duration, wherein at least one of the periodic demand schedules of the one or more periodic demand schedules includes a first demand forecast for a first time, the first demand forecast being based at least in part on the demand information; and
   determining an allocation of the portion of wireless spectrum to the first operator network based at least in part on the supply information, the first demand information, and the one or more periodic demand schedules, wherein the determination is based at least in part on a number of network outages associated with the first operator network.

25. The computer program product of claim 24, the computer-executable instructions when executed by the at least one processor further perform the operations comprising, in response to the determination, sending configuration information associated with the portion of wireless spectrum for configuring the first operator network for communication via the portion of wireless spectrum.

26. The computer program product of claim 24, wherein the portion of wireless spectrum comprises a first portion of wireless spectrum, and wherein the determination comprises allocating a second portion of wireless spectrum to the second operator network.

27. The computer program product of claim 25, wherein the configuration information comprises at least one of one or more frequencies corresponding to the portion of wireless spectrum, an authentication code for accessing the one or more frequencies, or a time period during which the portion of wireless spectrum may be utilized.

28. The computer program product of claim 24, the computer-executable instructions when executed by the at least one processor further perform the operations comprising:
  determining a demand forecast for the portion of wireless spectrum based at least in part on historical demand information; and
  sending the demand forecast to one or more suppliers of wireless spectrum.

* * * * *